United States Patent
Tanaka et al.

(10) Patent No.: US 6,292,875 B1
(45) Date of Patent: *Sep. 18, 2001

(54) CONTROL DEVICE FOR STORAGE DEVICE AND METHOD OF ACCESSING THE STORAGE DEVICE

(75) Inventors: Ryuta Tanaka; Takahiro Aoki; Masami Mizutani, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/781,907

(22) Filed: Dec. 30, 1996

(30) Foreign Application Priority Data

Jun. 5, 1996 (JP) .................................... 8-142644

(51) Int. Cl.⁷ ..................................................... G06F 12/00
(52) U.S. Cl. ......................... 711/154; 370/294; 370/543; 370/544; 710/52; 710/1; 711/114
(58) Field of Search ...................................... 711/156, 157, 711/5, 154, 162, 114; 370/321, 294, 295, 509, 512, 543, 544; 712/152; 714/5, 6, 7; 710/56, 66, 68

(56) References Cited

U.S. PATENT DOCUMENTS

| | | | | |
|---|---|---|---|---|
| 4,471,480 | * | 9/1984 | Haussmann et al. | 370/242 |
| 5,400,328 | * | 3/1995 | Burren et al. | 370/294 |
| 5,442,625 | * | 8/1995 | Gitlin et al. | 370/342 |
| 5,481,543 | * | 1/1996 | Veltman | 370/94.1 |
| 5,566,208 | * | 10/1996 | Balakrishnan | 375/240 |
| 5,764,893 | * | 6/1998 | Okamoto et al. | 709/231 |
| 5,842,160 | * | 11/1998 | Zinser | 704/229 |
| 5,850,395 | * | 12/1998 | Hauser et al. | 370/398 |
| 5,856,971 | * | 1/1999 | Gitlin et al. | 370/335 |
| 5,877,814 | * | 3/1999 | Reininger et al. | 348/500 |
| 5,890,202 | * | 3/1999 | Tanaka | 711/111 |
| 5,893,065 | * | 4/1999 | Fukuchi | 704/500 |

FOREIGN PATENT DOCUMENTS

| | | |
|---|---|---|
| 58-101359 | 6/1983 | (JP) . |
| 63-46899 | 2/1988 | (JP) . |
| 1-297762 | 11/1989 | (JP) . |
| 3-246713 | 11/1991 | (JP) . |
| 4-310161 | 11/1992 | (JP) . |
| 06175786A | 12/1992 | (JP) . |
| 07110788A | 10/1993 | (JP) . |
| 07114446A | 10/1993 | (JP) . |
| 07200183A | 12/1993 | (JP) . |
| 7-93237 | 4/1995 | (JP) . |
| 09325865A | 12/1997 | (JP) . |

OTHER PUBLICATIONS

S. Paek et al., Video Server Retrieval scheduling for Variable Bit Rate Scalable Dideo, IEEE Proceeding on Multimedia, pp. 108–112, 1996.*

E. Chang, et al., Variable Bit Rate MPEG Video Storage on Parallel Disk Arrays, IEEE Proceeding on Multimedia, pp. 127–137, 1994.*

* cited by examiner

*Primary Examiner*—Matthew Kim
*Assistant Examiner*—Pierre-Michel Bataille
(74) *Attorney, Agent, or Firm*—Helfgott & Karas, P.C.

(57) ABSTRACT

In a control device for a storage device in which data streams are respectively divided into unit data, which are distributed to storage parts and are sequentially read therefrom for every unit data, there is provided a buffer memory which stores data to be written into the storage parts and data read from the storage parts. An input/output control part causes the unit data from the storage parts in an access cycle corresponding to a bit rate to be stored in the buffer memory and causes the unit data stored in the buffer memory at the bit rate to be written into the storage parts. An input/output interface part reads the unit data from the buffer memory at the bit rate and causes the data transferred at the bit rate to be stored in the buffer memory.

14 Claims, 20 Drawing Sheets

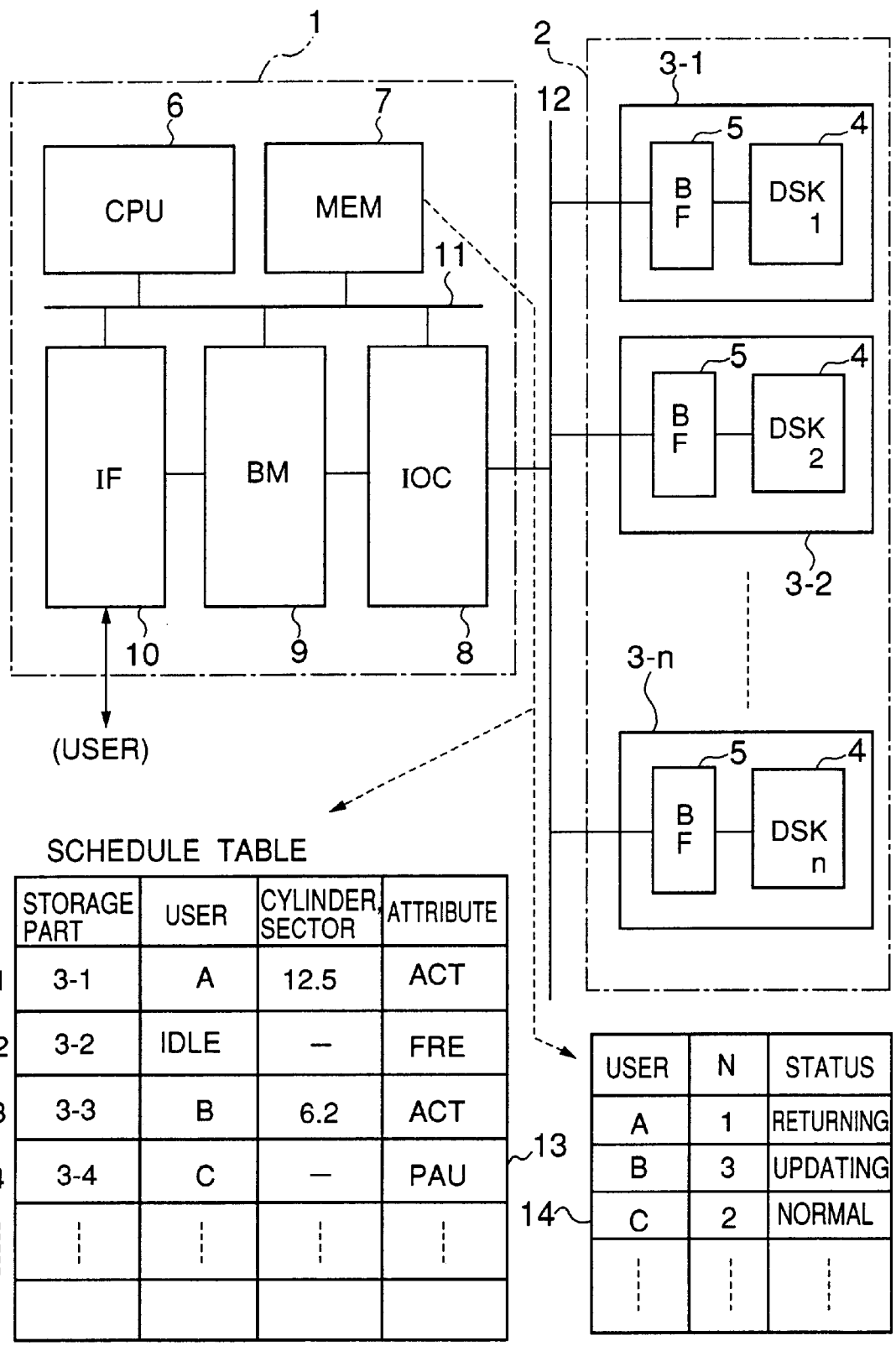

| DSK1 | 1 |   |   | 4 |   |   | 7 |   |   | 3 |   |   | 6 |   |   |
|------|---|---|---|---|---|---|---|---|---|---|---|---|---|---|---|
| DSK2 |   | 2 |   |   | 5 |   |   | 1 |   |   | 4 |   |   | 7 |   |
| DSK3 |   |   | 3 |   |   | 6 |   |   | 2 |   |   | 5 |   |   | 1 |

|     | No. | ATS | R/W  | STATUS |                              |
|-----|-----|-----|------|--------|------------------------------|
| Re  | 1   | 1   | R    |        | ⎫                            |
|     | 2   | 4   | R    |        | ⎬ REGISTRATION ORDER FOR READ |
|     | 3   | 7   | R    | BUSY   | ⎭                            |
| Rs  | 4   | 3   | R    | BUSY   | ← L                          |
| Ws  | 5   | 6   | W    |        | ⎫                            |
| We  | 6   | 2   | W    |        | ⎬ REGISTRATION ORDER FOR WRITE |
|     | 7   | 5   | IDLE | —      | ⎭                            |

CONTROL DEVICE FOR STORAGE DEVICE AND METHOD OF ACCESSING THE STORAGE DEVICE

BACKGROUND OF THE INVENTION

1. Field of the Invention

The present invention relates a storage device having a plurality of storage parts such as magnetic disk drives, and a method of accessing such a storage device.

A storage device is known in which a plurality of different kinds of data streams are written, in dispersed formation, into storage parts such as magnetic disk drives every unit data and is sequentially read therefrom every unit data. Such a storage device enables a multiple access, and may be applied to various applications such as a VOD (Video On Demand). It is desired to realize a flexibility of access to the storage device having a plurality of storage parts.

2. Description of the Related Art

FIG. 1 is a block diagram of a conventional storage device having seven magnetic disk drives DSK1 through DSK7 respectively serving as storage parts. Symbols "title1-1", "title1-2", "title1-3", . . . respectively denote unit data, which is obtained by dividing a data stream title1. Symbols "title2-1", "title2-2", "title2-3", . . . respectively denote unit data, which is obtained by dividing a data stream title2. Similarly, Symbols "title7-1", "title7-2", "title7-3", . . . respectively denote unit data, which is obtained by dividing a data stream title7. The pieces of the data stream title1–title7 are stored, every unit data, in the magnetic disk devices DSK1–DSK7 in the dispersed formation. A storage method as described above is called a striping method.

When the data stream title1 is specified and read, the unit data title1-1 is read from the magnetic disk drive DSK1. Next, the unit data title1-2 is read from the magnetic disk drive DSK2. Then, the unit data title1-3 is read from the magnetic disk drive DSK3. The above read operation is indicated by arrows of broken lines shown in FIG. 1. That is, the magnetic disk drives are sequentially accessed in the order of DSK1, DSK2, DSK3, DSK4, DSK5, DSK6, DSK7, DSK1, . . . , whereby the data stream title1 is read therefrom. When the data title6 is specified and read, the magnetic disk drives DSK1 through DSK7 are accessed in the order of DSK6, DSK7, DSK1, DSK2, DSK3, DSK4, DSK6, DSK6, DSK7, . . . , so that the reading cycles thereof do not conflict with the cycles for reading the unit data title1-6, title1-7, . . .

For example, if the data stream is video data, the unit data is defined by compressing and encoding video data equal to one frame or a few frames. If the title title2 is specified, the first unit data is read from the magnetic disk drive DSK2 as title2-1, and the next unit data is read from the magnetic disk drive DSK3 as title2-2. On the receiving and reproducing side, the unit data is decoded and buffered, so that the consecutive data stream can be reproduced. The compressing and encoding method for video data may be various known methods. For example, a standardized compressing and encoding method such as an MPEG (Moving Picture Experts Group) can be used. In this case, the video data is stored in the dispersed formation every unit data equal to one frame or a few frames.

FIG. 2 is a sequence diagram of a read operation, which was proposed in a prior Japanese Patent Application which is not laid-opened or published and is not prior art.

In FIG. 2, symbols (DSK1)–(DSKn) indicate access states of the magnetic disk drives DSK1–DSKn, and a symbol (BUS) denotes a read request and data transferred on a bus BUS. Data read from the magnetic disk drives DSK1–DSKn in response to a read request from a user are transferred on the bus BUS. The magnetic disk drives DSK1–DSKn are connected together via the bus BUS, and perform data read process with respect to a read request applied via the bus BUS. Then, the magnetic disk drives DSK1–DSKn buffer read data and transfer the read data via the bus BUS. Hence, the read request and read data alternately appear on the bus BUS. Each of the magnetic disk drives DSK1–DSKn performs the read process in response to the read request, and sends the read data to the bus BUS.

The magnetic disk drives are sequentially accessed so that unit data D1, D2, . . . are sequentially read from the magnetic disk drives DSK1, DSK2, . . . Free or idle times are provided in access time slots which are not identical times with respect to the magnetic disk drives DSK1–DSKn, so that an access modification can be handled. In FIG. 2, blocks of broken lines denote idle access time slots.

FIG. 3 is a sequence diagram of a write operation, which was proposed in the prior Japanese Patent Application which is not laid-opened or published and is thus not prior art. As shown in FIG. 2, the symbols (DSK1)–(DSKn) indicate access states of the magnetic disk drives DSK1–DSKn, and the symbol (BUS) denotes a read request and data transferred on the bus BUS. FIG. 3 shows a case where a read request and a write request coexist. The read process is carried out for the read request as has been described above, and data is transferred via the bus BUS. The write process is performed so that write data following the write request is input to a corresponding one of the magnetic disk drives DSK1–DSKn. That is, the data is written into the magnetic disk drives DSK1–DSKn for each unit data, namely, WD1, WD2, . . .

For example, in the write process in the magnetic disk drive DSK3, the write request and write data are input thereto before the immediately previous read process is completed. Hence, the read process immediately before the write process is completed, and it is necessary to make the time slot idle, as indicated by the broken line. Hence, as shown in FIG. 3, by providing the idle time slot, the access time slot immediately thereafter can be used for writing.

FIGS. 4A and 4B show two states of a schedule table, which was proposed in the prior Japanese Patent Application which is not laid-opened or published and is thus not prior art. The scheduling is carried out so that n·m+k is satisfied where n is the sum of the maximum number of users and the number of idle access time slots, m is an integer equal to or greater than 1, and k is an integer that satisfies a condition 1≦k<n. For example, n=7, m=5 and k=1, the maximum number of users is 34, and the number of idle access time slots is 2.

The schedule table as shown in FIGS. 4A and 4B needs an area equal to at least twice the above-mentioned condition (n·m+k). A pointer is used to indicate a position to be referenced, and specified information concerning the magnetic disk drive located at the pointed position and user information are read. Then, a command to the specified magnetic disk drive (storage part) is issued. The same content as described above is written into an area located with an access cycle T starting from the position indicated by the pointer. That is, the same user information is written into two areas spaced apart therefrom at an interval equal to the cycle T of the schedule table. The pointer is sequentially moved at given time intervals, and the access control of the storage device can be carried out in accordance with the user information in the area indicated by the pointer and the corresponding magnetic disk drive.

For example, as shown in FIG. 4A, specified information concerning the magnetic disk drive DSK1 and user A information are stored in the area indicated by the pointer. Specified information concerning the magnetic disk drive DSK2 to be next accessed and user A information are stored in the area located after the access cycle T from the above area in which the specified information concerning the drive DSK1 and the user A information are stored. When an access command to the magnetic disk drive DSK1 in the area indicated by the pointer is issued to the storage device by a control device, the user A information corresponding to the magnetic disk drive DSK1 located in the pointed position is deleted.

Next, as shown in FIG. 4B, the pointer indicates the magnetic disk drive DSK2 to be next accessed. In this case, the drive DSK2 is idle. In the state shown in FIG. 4A, the user A information and the specified information concerning the magnetic disk drive DSK2 are stored in the position after the access cycle T from the position specified by the pointer. Hence, in the state shown in FIG. 4B, the magnetic disk drive DSK3 to be accessed after the access cycle T is stored with respect to the user A. That is, the magnetic disk drives to be accessed with respect to the same user are always written into two areas (positions) located at the access interval T.

In the state shown in FIG. 4B, an access command to the storage device is not issued (pause) by the control device with respect to the magnetic disk drive DSK2 in the area specified by the pointer if the aforementioned idle time slot is set. The control device is allowed to perform another process such as a maintenance process during the above pause cycle. Hence, the control device can efficiently be operated.

Even if there is no specified user, there is a magnetic disk drive after the access cycle T. Thus, after the pause cycle for the magnetic disk drive DSK2, the issue of an access command is made to pause after the access cycle T following the pause for the magnetic disk drive DSK2. Hence, the pause cycles can be serially provided for the respective magnetic disk drives, so that desired processes such as a request for a modification of the access schedule and a process for correcting the positions of heads of the magnetic disk drives.

The number of users is determined based on the number of magnetic disk drives of the storage device. Hence, it may be considered to add some magnetic disk drives in accordance with an increase of users. For example, as shown in FIG. 5A, unit data of a data stream is read and transferred via the bus BUS with the access cycle T in the structure in which the magnetic disk drives DSK1–DSKn are connected to the bus BUS.

As shown in FIG. 5B, if a (arbitrary number) magnetic disk drives DSKn+a are newly provided, the unit data is read from the magnetic disk drive DSK1 and the next unit data is read from the magnetic disk drive DSK2 after a time tv longer than the access cycle T passes in order to enable the sequential access to the disk magnetic drives DSK1–DSKn+a. Hence, when new magnetic disk drives are provided, it is necessary to rearrange the unit data so that the unit data can be read within the access cycle T.

As shown in FIG. 5C, it is possible to sequentially read the unit data within the access cycle T even after new magnetic disk drives are provided by rearranging the unit data beforehand so that a new provision of magnetic disk drives DSKn+b (b is an arbitrary integer) can be made. In this case, it is necessary to rearrange the unit data as shown in FIG. 5B, if a number of magnetic disk drive greater than a predetermined maximum number of magnetic disk drives is newly provided.

When data stored in the storage device having a plurality of magnetic disk drives is requested at a given bit rate by the user, the above-mentioned process can accept this request.

However, the user may request data at a bit rate lower or higher than the given bit rate. For example, it is requested to realize a slow reproduction or a quick reproduction. The above-mentioned process cannot quickly respond to such requests. A similar problem occurs when the user requests to write data at a low or high bit rate rather than a normal given bit rate.

An increase in the storage capacity of the whole storage device in accordance with an increase in the number of users needs a rearrangement of unit data as has been described previously. In this case, it is necessary to stop providing the users with services, so that the services are degraded.

SUMMARY OF THE INVENTION

It is a general object of the present invention to overcome the above disadvantages.

A more specific object of the present invention is to easily cope with a request for modification of the access bit rate or an extension of the storage device.

The above objects of the present invention are achieved by a control device for a storage device in which data streams are respectively divided into unit data, which are distributed to storage parts and are sequentially read therefrom for every unit data, the control device comprising: a buffer memory which stores data to be written into the storage parts and data read from the storage parts; an input/output control part which causes the unit data from the storage parts in an access cycle corresponding to a bit rate to be stored in the buffer memory and causes the unit data stored in the buffer memory at the bit rate to be written into the storage parts; and an input/output interface part which reads the unit data from the buffer memory at the bit rate and causes the data transferred at the bit rate to be stored in the buffer memory.

The above control device may be configured as follows. The buffer memories comprises a first buffer and a second buffer having a storage capacity which enables the unit data read or written during the access cycle. The input/output interface part performs a switching operation on the first and second buffers in response to a change of the bit rate.

The above control device may be configured as follows. A group is defined which includes a minimum number of storage parts which enables a given service. The storage device includes a plurality of such groups. The control device comprises control parts respectively provided to the plurality of groups, and a controller which controls the control parts.

The above objects of the present invention is also achieved by a method of accessing a storage device comprising storage parts and a control device, wherein data streams are divided into unit data, which are distributed to and written into the storage parts and are sequentially read therefrom for every unit data, the method comprising the steps of: storing the unit data which is read during a cycle nT in a buffer memory in response to a request to change a read bit rate from an original bit rate to another bit rate where T is an access cycle and n is the number of the storage parts;

reading the unit data from the buffer memory in a cycle nTN where N is a bit rate parameter; and making reading of the data streams during a cycle nT(N−1) after the cycle nT to pause, so that data is sent from the storage device at the another bit rate equal to 1/N.

The above method may further comprise the steps of: writing the unit data into a first buffer of the buffer memory during the cycle nT; writing the unit data into a second buffer of the buffer memory during a next cycle nT; reading the unit data from the first buffer during the cycle nT(N−1); reading the unit data from the second buffer during the cycle nT(N−1); and reading remaining unit data stored in one of the first and second buffers at the original bit rate when the write bit rate should be changed to the original bit rate.

The above method may further comprise the steps of: causing at least one of access time slots arranged in an access order for the storage parts to an idle access time slot; grouping the access time slots into a first group provided for reading and a second group provided for writing; assigning the first group of access time slots to a read request; assigning the second group of access time slots to a write request; and changing grouping of the access time slots if the first group or the second group does not have enough access time slots to accept the read request or the write request, so that the read request or the write request can be accepted.

The above method may be configured as follows. A a group is defined which includes a minimum number of storage parts which enables a given service. The storage device includes a plurality of such groups. The control device comprises control parts respectively provided to the plurality of groups, and a controller which controls the control parts. The method comprises a step of distributing, under control of the control parts and the controller, access requests which concentrate on one of the groups to other groups.

The above method may be configured as follows. A group is defined which includes a minimum number of storage parts which enables a given service. The storage device includes a plurality of such groups. The control device comprises control parts respectively provided to the plurality of groups, and a controller which controls the control parts. The method comprises a step of jumping, under control of the control parts and the controller, an access request to a first group from a second group to which the access request is originally applied, the first group having data identical to or close to data stored in the second group.

The above objects of the present invention are also be achieved by a method of accessing a storage device comprising storage parts and a control device, wherein data streams are divided into unit data, which are distributed to and written into the storage parts and are sequentially read therefrom for every unit data, the method comprising the steps of: storing the unit data which is input during a cycle equal to N times a cycle nT in a buffer memory in response to a request to change a write bit rate from an original bit rate to another bit rate where N is a bit rate parameter, T is an access cycle and n is the number of the storage parts; reading the unit data from the buffer memory and writing the unit data thus read into the storage parts in the cycle nT; and making writing of the data streams during a cycle nT(N−1) before the cycle nT to pause, so that data is written into the storage parts at the another bit rate equal to 1/N.

The above method may further comprise the steps of: storing the unit data which is input during the cycle nTN into a first buffer of the buffer memory; writing the unit data read from the first buffer during the cycle nT into the storage parts; storing unit data which is input in the cycle nTN in a state where the unit data is written into the storage parts in a second buffer of the buffer memory; writing the unit data read from the second buffer in the cycle nT into the storage parts; and storing, when the write bit rate should be changed to the original bit rate, input unit data into one of the first and second buffers and writing unit data remaining another one of the first and second buffers into the storage parts.

The method may further comprise the steps of: causing at least one of access time slots arranged in an access order for the storage parts to an idle access time slot; grouping the access time slots into a first group provided for reading and a second group provided for writing; assigning the first group of access time slots to a read request; assigning the second group of access time slots to a write request; and changing grouping of the access time slots if the first group or the second group does not have enough access time slots to accept the read request or the write request, so that the read request or the write request can be accepted.

The above method may be configured as follows. A group is defined which includes a minimum number of storage parts which enables a given service. The storage device includes a plurality of such groups. The control device comprises control parts respectively provided to the plurality of groups, and a controller which controls the control parts. The method comprises a step of distributing, under control of the control parts and the controller, access requests which concentrate on one of the groups to other groups.

The above method may be configured as follows. A group is defined which includes a minimum number of storage parts which enables a given service. The storage device includes a plurality of such groups. The control device comprises control parts respectively provided to the plurality of groups, and a controller which controls the control parts. The method comprises a step of jumping, under control of the control parts and the controller, an access request to a first group from a second group to which the access request is originally applied, the first group having data identical to or close to data stored in the second group.

BRIEF DESCRIPTION OF THE DRAWINGS

Other objects, features and advantages of the present invention will become more apparent from the following detailed description when read in conjunction with the accompanying drawings, in which:

FIG. 6 is a block diagram of a first embodiment o the present invention;

DESCRIPTION OF THE PREFERRED EMBODIMENTS

Figure 1:
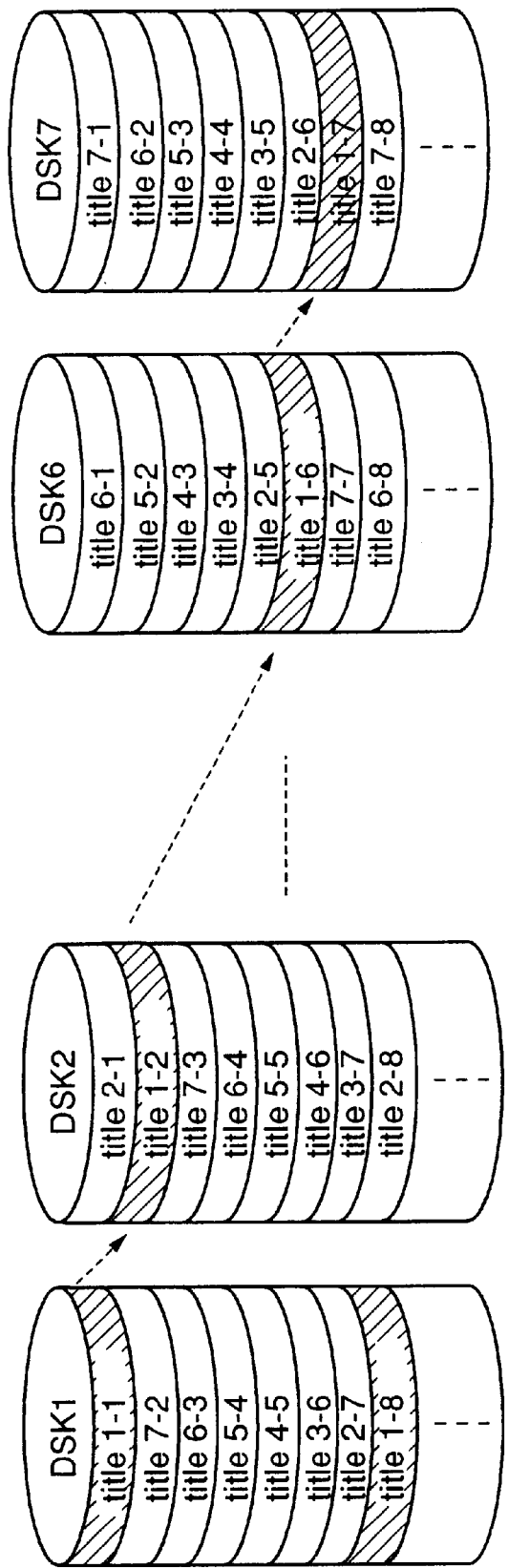
FIG. 1 is a block diagram of a conventional storage device having seven magnetic disk drives.

FIG. 6 is a block diagram of a storage device according to a first embodiment of the present invention. The storage device shown in FIG. 6 includes a control device 1, a storage device 2, storage parts 3-1 through 3-n, storage media 4 (for example, magnetic disk drives DSK1–DSKn), and buffer memories (BF) 5 such as cache memories. Further, the storage device includes a processor 6 such as a CPU, a main memory (MEM) 7, an input/output control device (IOC) 8, a buffer memory (BM) 9, an interface part (IF) 10 with respect to users, an internal bus 11, a common bus 12, a schedule table 13 and a parameter table 14.

The control device 1 includes the processor 66, the main memory 7, the input/output control device 8, the buffer memory 9 and the interface part 10, which are connected together via the internal bus 11. The control device 1 is connected to the storage device 2 via the common bus 12. The input/output control device 8, the buffer memory and the interface part 10 are connected together via specific buses which allow data to be directly transferred therebetween. The processor 6 controls the parts of the storage device in accordance with programs stored in the main memory 7. An input device, a display and/or a printing machine for maintenance work can be connected to the control device 1.

The storage device 2 is comprised of the plurality of storage parts 3-1 through 3-n, which include the respective buffer memories 5. The write data are buffered in the buffer memories 5 and are then written into the storage media 4. Data read from the storage media 4 are buffered in the buffer memories 5, and are sent to the common bus 12. The buffer memories 4 may be called cache memories. The storage device 2 having the storage parts 3-1 through 3-n is connected to the control device 1 via the common bus 12. The common bus 12 can be a bus in conformity with the SCSI (Small Computer System Interface) standard. In this case, the input/output control device 8 functions as a SCSI controller.

Figure 4A:
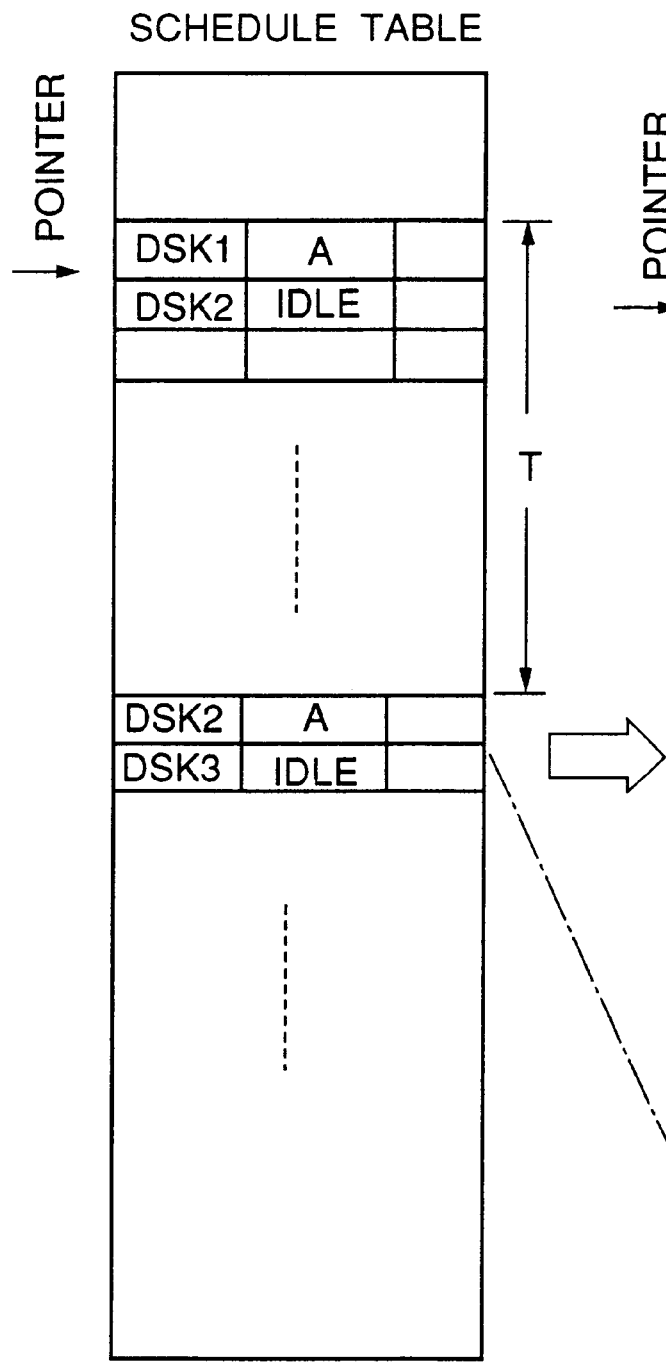
FIGS. 4A and 4B are diagrams of a schedule table which was previously proposed but is not known.
Figure 4B:
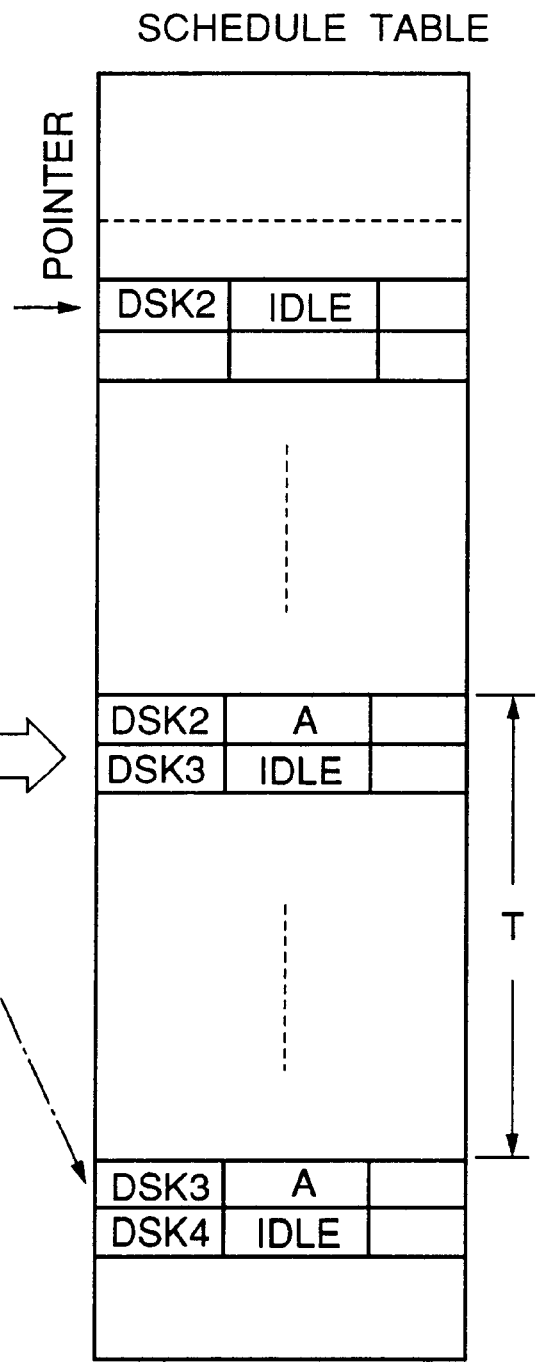
Figure 5A:
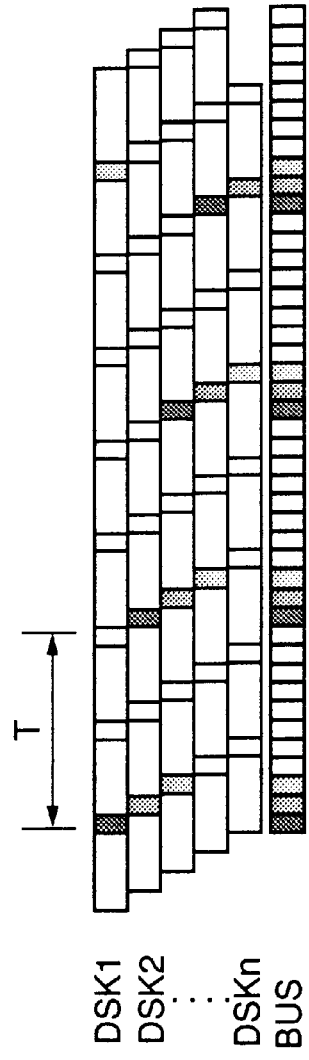
FIGS. 5A, 5B and 5C are diagrams which explain an extension of magnetic disk drives.
Figure 5C:
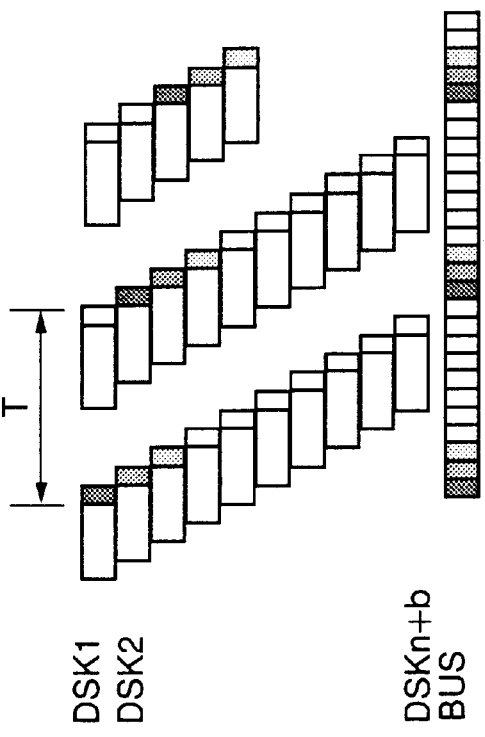
Figure 5B:
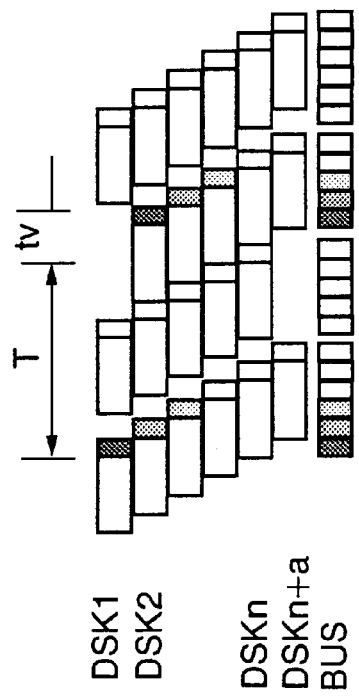

The schedule table 13 and the parameter table 14 are formed in the main memory 7. Alternatively, the tables 13 and 14 can be formed in another memory area. The schedule table 13 has a storage part, and storage areas respectively related to user information indicative of an access source, a cylinder number and sector number of a magnetic disk as the recording medium 4, and an attribute. A symbol ACT provided in the attribute area indicates "in operation", FRE indicates "free" and PAU indicates a pause. As in the case shown in FIGS. 4A and 4B, information concerning the storage parts corresponding to the users are written in the access cycle T, and a storage area equal to twice the number of storage parts 3-1–3n is provided.

The schedule table 13 stores, in the first row, information showing an indication of the storage part 3-1, user A, cylinder and sector 12, 5, and attribute ACT. The second row of the schedule table 13 stores information which shows that the storage part 3-2 specified in the second row is free and attribute information is FRE. The third row of the schedule table 13 stores information indicative of the storage part 3-3, user B, cylinder 6, sector 2 and attribute ACT. The fourth row of the schedule table 13 stores information indicative of the storage part 3-4, user C, attribute PAU. In each of the storage parts 3-1 through 3-n, at least once access time slot is made idle in order to allow a modification of the access. The idle access time slot corresponds to the second storage part 3-2, and the attribute thereof is made to be FRE.

The parameter table 14 stores, each of the users A, B, C, ..., a bit rate parameter N and a status parameter. The status parameter indicates "returning", "updating" or "normal". If a user requests the bit rate to be changed to a slow reproduction from the normal reproduction, the status information changes to "updating" from "normal". When the updating process is completed, the reproduction continues at a given low bit rate, and the status information is changed to "normal" from "updating". If the user requests the bit rate to be changed to the normal bit rate from the low bit rate, the status information is changed to "returning" from the normal, and is changed to the normal when the returning process is completed. When the bit rate parameter N is equal to 1, the normal bit rate is indicated. When N=2, a bit rate half the normal bit rate is indicated. When N=3, a bit rate equal to one third the normal bit rate is indicated. If the normal bit rate is set equal to 2 of the bit rate parameter N, a high bit rate is indicated by 1 of the bit rate parameter N, and a low bit rate is indicated by 3 thereof.

The unit data in the writing and reading operations on the storage parts 3-1 through 3-n is selected taking into account the data transfer bit rate, and/or the storage capacity of the buffer memory 9. For example, if the unit data is relatively a small amount of data, it is necessary to perform a switching operation on the storage parts 3-1 through 3-n at a relatively short interval. Data having a relatively short length should be transferred on the common bus 12. Hence, the transfer bit rate is decreased. If the unit data is relatively a large amount of data, it is possible to transfer consecutive data and to easily increase the transfer bit rate. However, this needs a relatively large storage capacity of the buffer memory 9. Hence, it is preferable to determine the unit data taking into account the scale of the storage device. It is possible to define a plurality of unit data having different sizes based on the types of data streams.

In response to a data read request, a data write request, or a bit rate change request from the users, the processor 6 of the control device 1 refers to the schedule table 13 formed in the main memory 7 and the parameter table 14 formed therein, and determines whether the received access request is acceptable. If there is a plurality of idle areas defined in the schedule table 13, the processor 6 determines that the received access request is acceptable. In this case, the user which generates the above access request is registered in the schedule table 13. If the access requests uses the normal bit rate, the processor 6 sets the bit rate parameter N equal to 1 in the corresponding user indication area of the parameter table 14 and changes the status to "normal".

Figure 7:
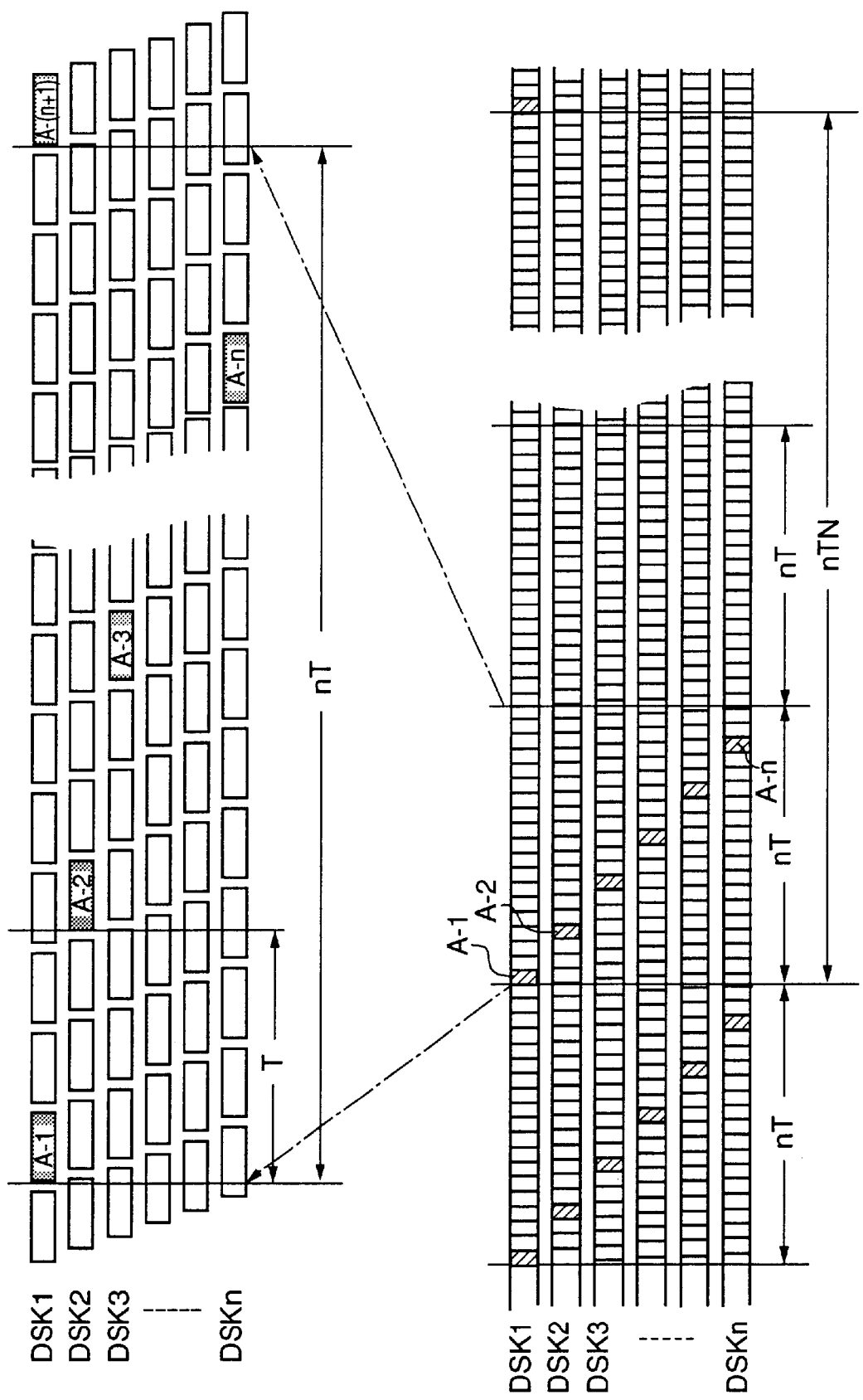
FIG. 7 is a sequence diagram of a read operation of the first embodiment of the present invention.

FIG. 7 is a diagram of a read operation of the storage device according to the first embodiment of the present invention. A cycle nT shown in a lower portion of FIG. 7 is enlarged in an upper portion thereof, where n is the number of magnetic disk drives DSK1–DSKn, and T is the access cycle. Unit data A-1 of a data stream is read from the magnetic disk drive DSK1, and unit data A-2 thereof is read from the magnetic disk drive DSK2 during the next (second) access cycle T. Similarly, unit data A-3 is read from the magnetic disk drive DSK3 during the third access cycle T, and unit data A-n is read from the magnetic disk drive DSKn from the n-th access cycle T. During the next access cycle T subsequent to the above n-th access cycle T, unit data is read from the magnetic disk drive DSK1. In this manner, the reading of unit data is repeatedly carried out.

Figure 2:
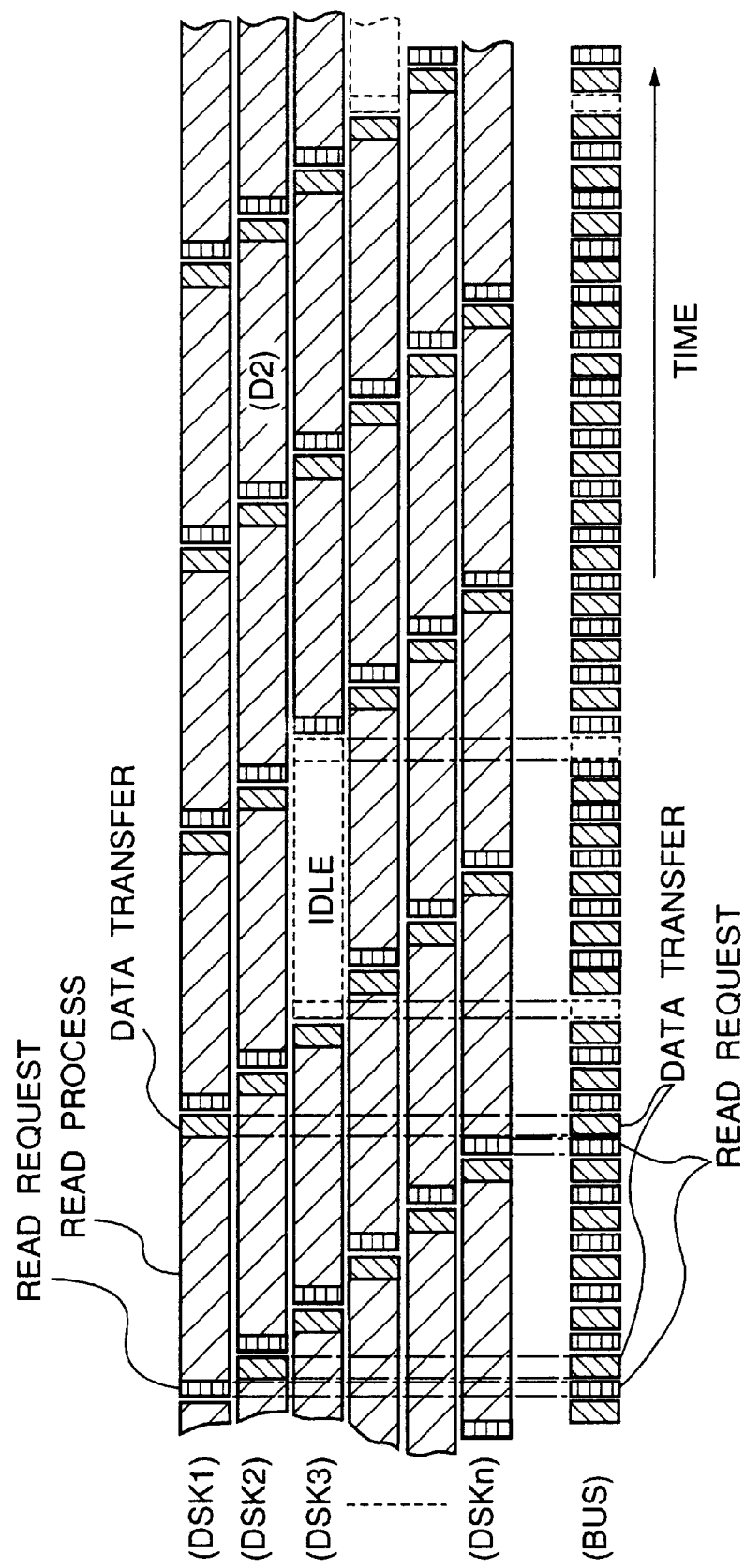
FIG. 2 is a sequence diagram of a read operation which was previously proposed but is not known.
Figure 3:
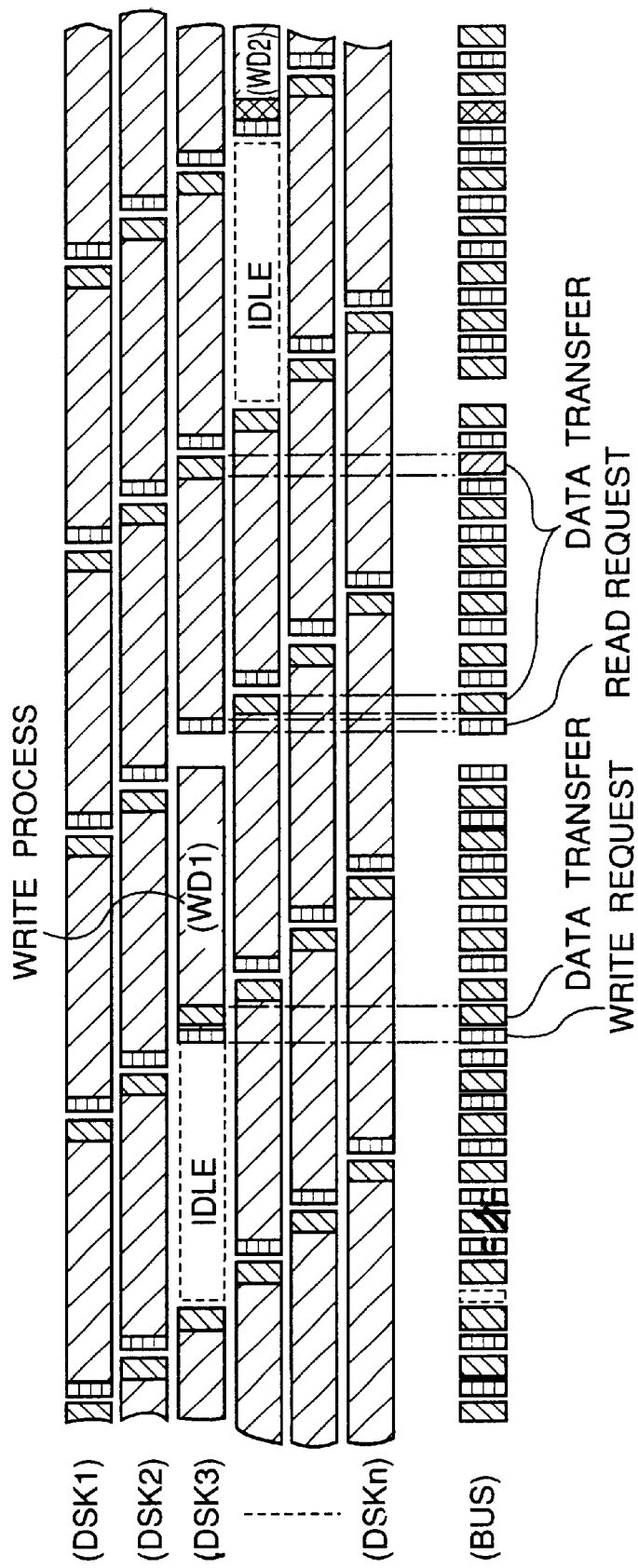
FIG. 3 is a sequence diagram of a write operation which was previously proposed but is not known.
Figure 8:
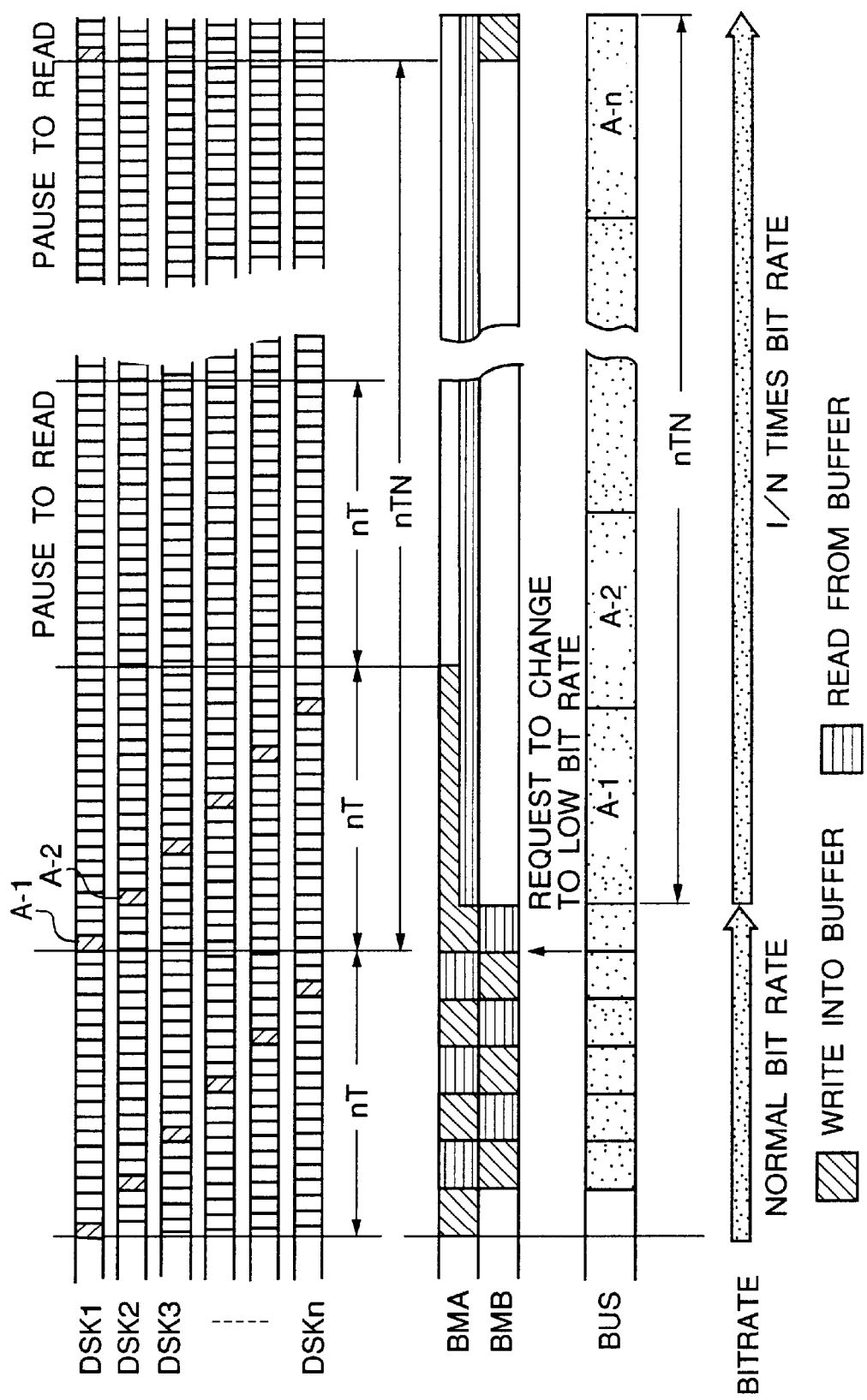
FIG. 8 is a sequence diagram of an operation executed when it is requested to change a read bit rate in the first embodiment of the present invention.

FIG. 8 is a diagram of an operation executed when the read bit rate is changed in the first embodiment of the present invention. In FIG. 8, symbols BMA and BMB denote buffer memories, and BUS denotes the bus. The same access state as that shown in the lower portion of FIG. 7 is shown in FIG. 8. In FIG. 8, parts of the buffer memories BMA and BMA and the bus BUS to be noted are enlarged and illustrated therein. In actuality, in the normal bit rate, a plurality of pieces of unit data are transferred in a multiplexed formation, as in the case (BUS) shown in FIG. 2.

When a request to change the bit rate from the normal bit rate to the low bit rate, data read from the magnetic disk devices DSK1–DSKn during the cycle nT are stored in the buffer memory BMA, and are read at bit rate 1/N. Then, the read data are transferred via the bus BUS. The cycle (n–1) TN after the above cycle nT is a pause cycle. That is, the read data stored in the buffer memory during the cycle nT is read during the cycle nTN and sent to the bus BUS. This is repeated until the returning request is issued. Hence, the data stream is read from the storage device at the bit rate equal to 1/N of the normal bit rate.

In this case, data can be transferred at the bit rate 1/N according to the user's request without changing the timing of access to the magnetic disk drives DSK1–DSKn by reading the unit data A-1, A-2, . . . , A-n from the magnetic disk drives DSK1–DSKn during the cycle nT, and reading the read data from the buffer memory BMA and sending the same to the bus during the cycle nTN. Hence, if the value of the bit rate parameter N is equal to 2, low bit rate data having a bit rate equal to half the normal bit rate can be realized. If the bit rate parameter N has a value of 3, low bit rate data having a bit rate equal to one third of the normal bit rate can be realized.

In the user area of the schedule table 13 which corresponds to the change-to-low-bit-rate request, the magnetic disk drives to be accessed for the next time are serially registered with respect to the cycle nT, as in the case of the normal state. With respect to the subsequent cycle nT(N–1), the attribute is set to the pause (PAU), and the value of the bit rate parameter N in the parameter table 14 is set equal to, for example, 5. In this case, data is sent to the user as low bit rate data having a bit rate equal to ⅕ of the normal bit rate.

Figure 9:
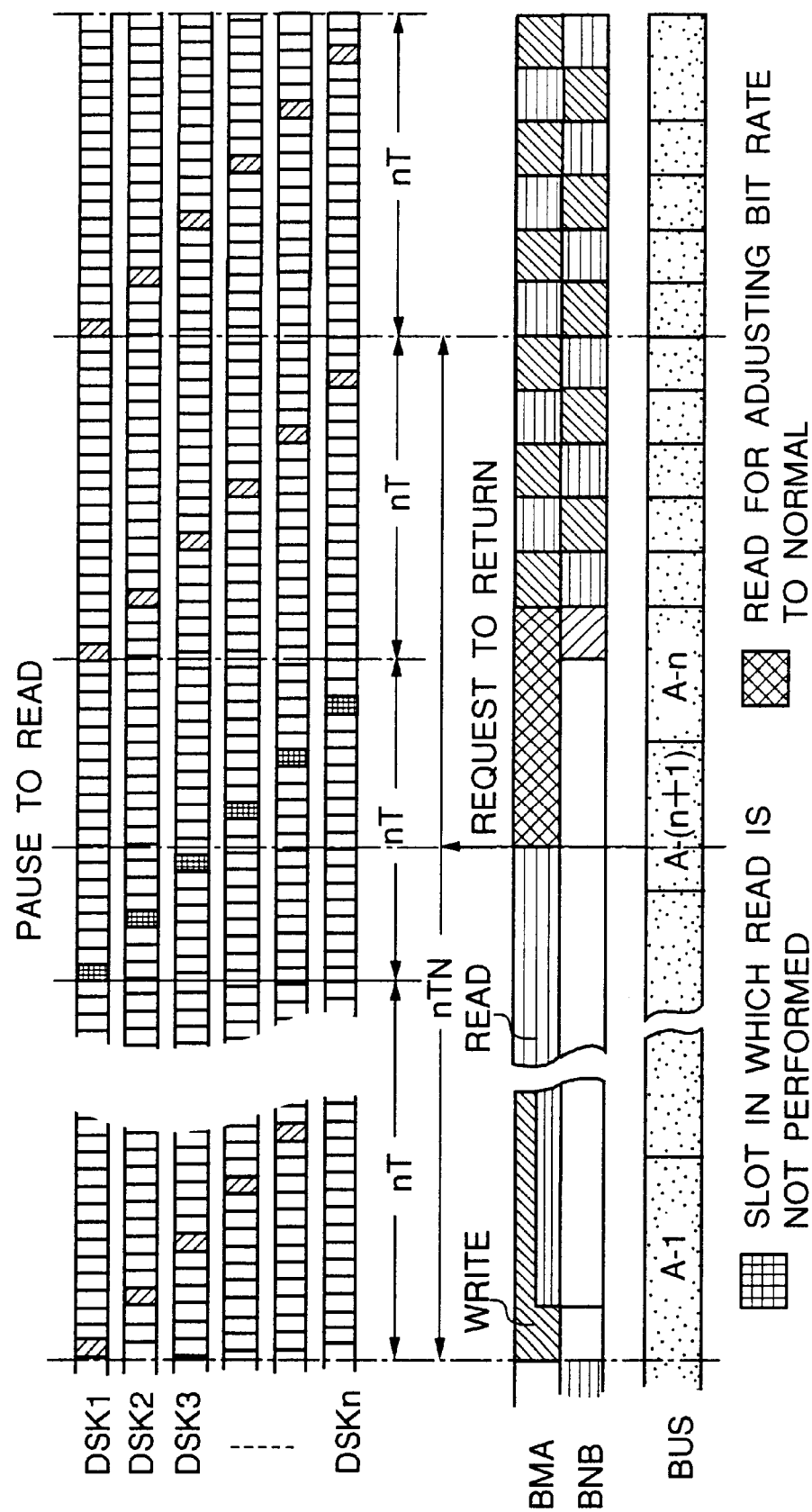
FIG. 9 is a sequence diagram of an operation executed when it is requested to return the read bit rate to the original bit rate in the first embodiment of the present invention.

FIG. 9 is a diagram of an operation executed when the read bit rate is returned to the normal bit rate in the first embodiment of the present invention. The buffer memories BMA and BMB and the bus BUS are enlarged with respect to the user on which is focused, as in the case shown in FIG. 8. When a request to return to the normal bit rate is issued during the read pause cycle nT directed to enabling the low bit rate operation, an adjustment of reading data is carried out so that data remaining in the buffer memory BMA is sent by the next cycle nT. Then, data are sequentially read from the magnetic disk drives DSK1–DSKn for each unit data, and the bit rate is returned to the normal bit rate as indicated by BMA, BMB and BUS shown in FIG. 9. In the above manner, read data can be transferred.

Figure 10:
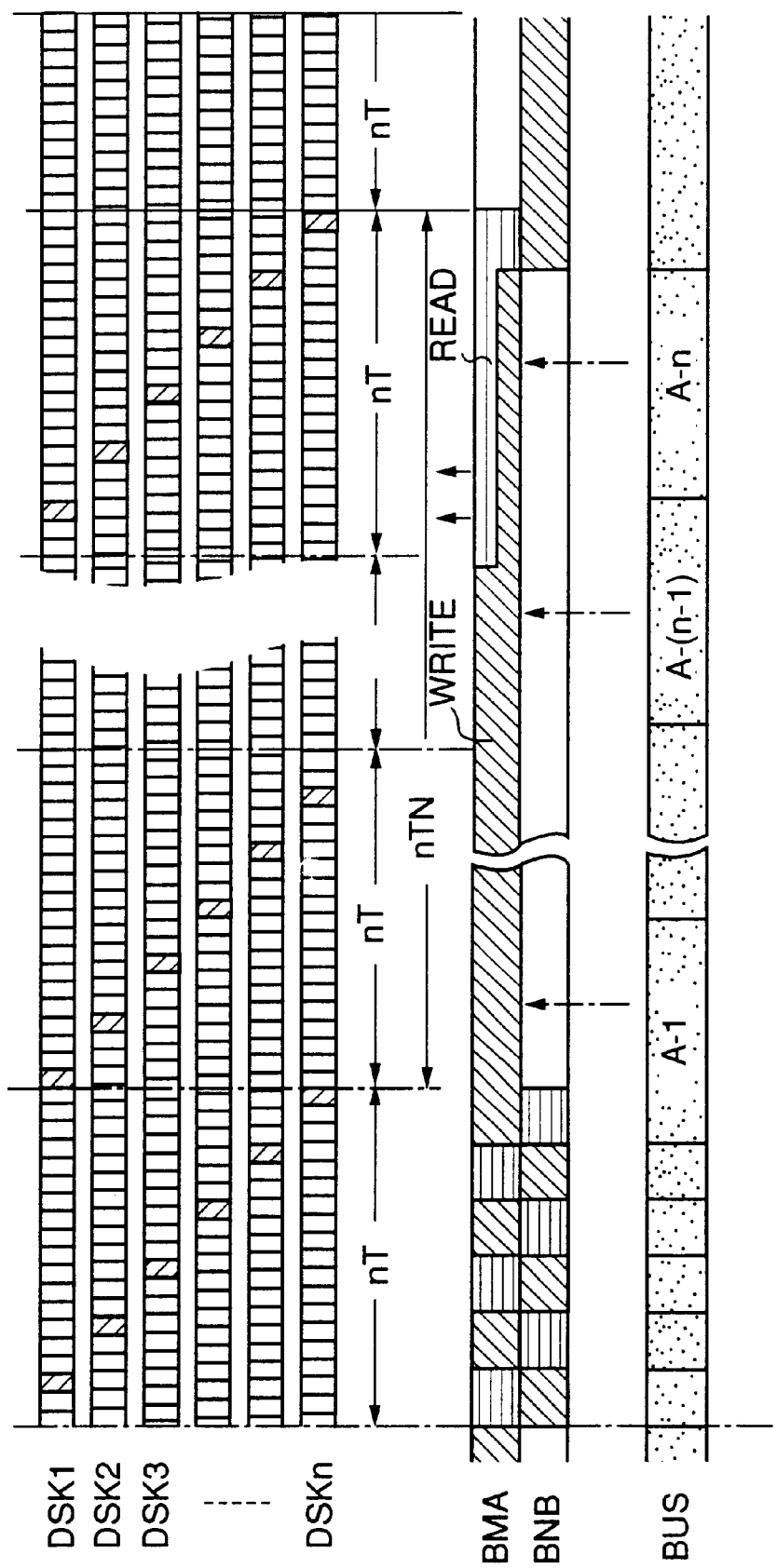
FIG. 10 is a sequence diagram of an operation executed when it is requested to change a write bit rate.

FIG. 10 is a diagram of an operation executed when the write bit rate is changed in the first embodiment of the present invention. The buffer memories BMA and BMB and the bus BUS are enlarged with respect to the user on which is focused, as in the case shown in FIGS. 8 and 9. If a request for low bit rate write is issued during the time when write data are transferred to the buffer memories BMA and BMB via the bus BUS and unit data are written into the magnetic disk drives DSK1–DSKn during the cycle nT, In this case, low bit rate unit data A-1, A-2, . . . , A-n are transferred to the bus BUS over the period nTN. The above unit data A-1, A-2, . . . , A-n are stored in the buffer memory BMA.

During the last period nT of the period nTN, the unit data A-1, A-2, . . . , A-n are sequentially read from the buffer memory BMA, and are written into the magnetic disk drives DSK1–DSKn. Hence, it is possible to store the low bit rate data having a bit rate equal to 1/N of the normal bit rate in the buffer memories BMA and BMB, and perform the write operation via these buffer memories without changing the timing of the access to the magnetic disk drives DSK1–DSKn.

Figure 11:
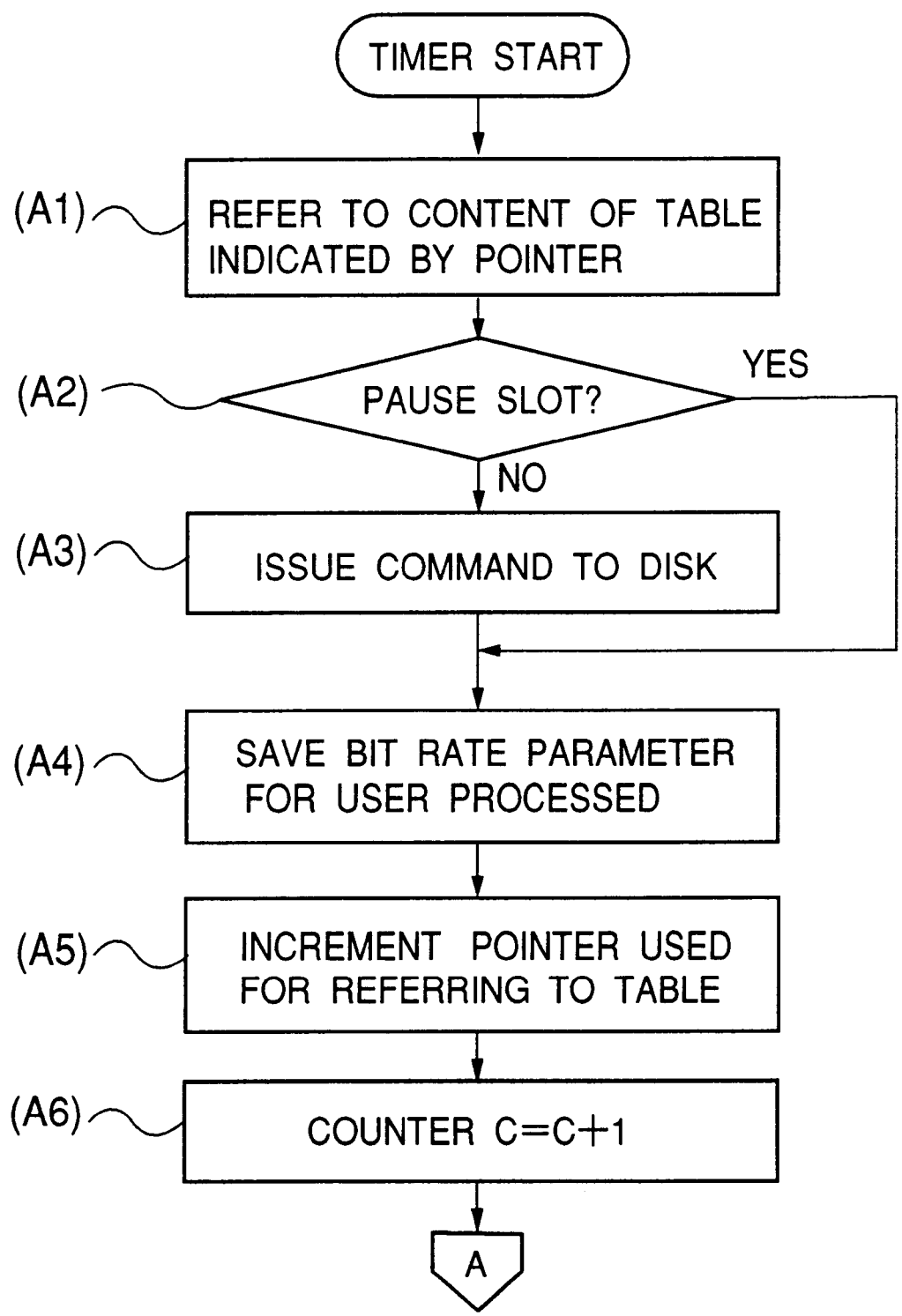
FIG. 11 is a flowchart of a low bit rate read operation of the first embodiment of the present invention.
Figure 12:
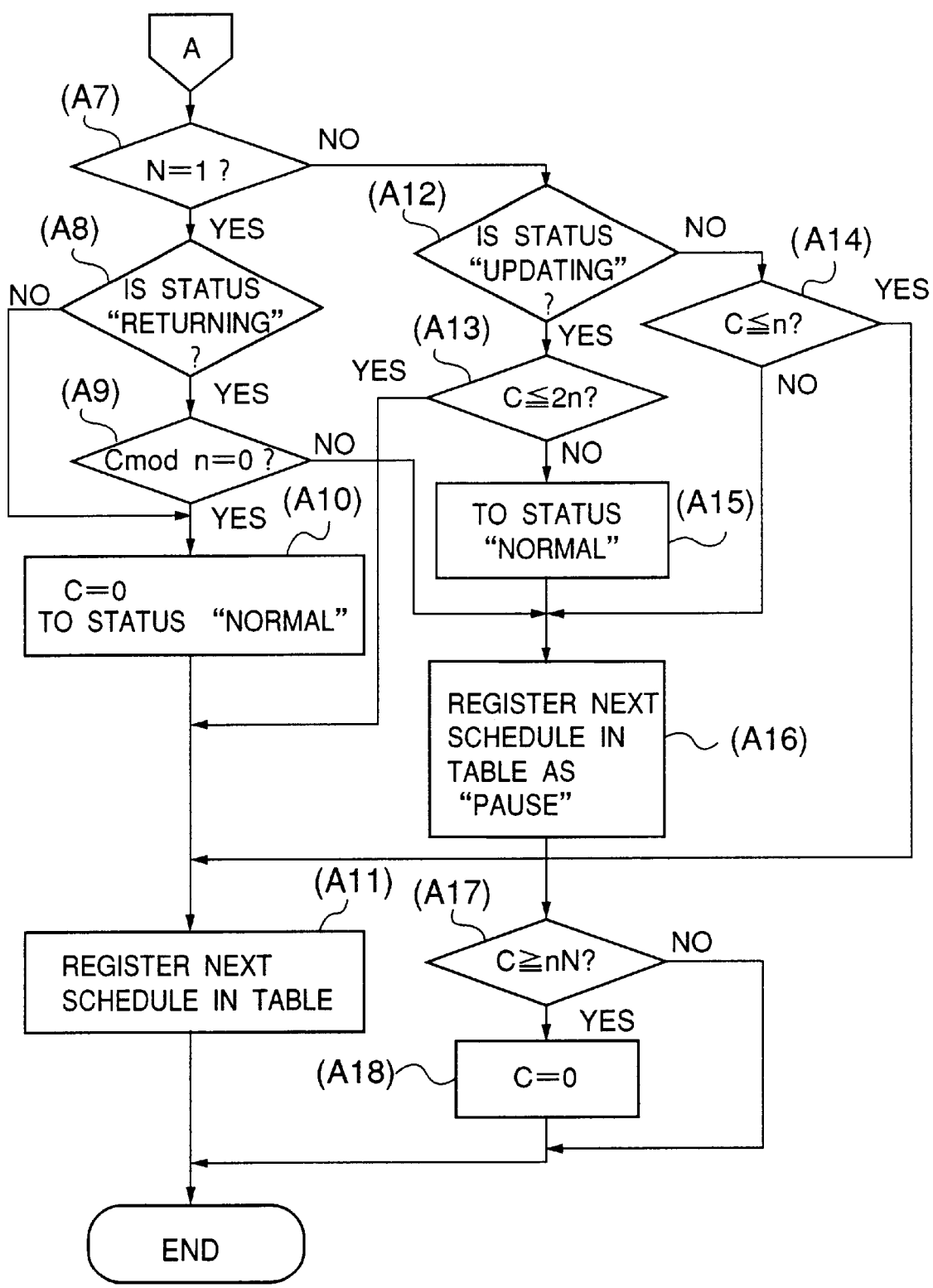
FIG. 12 is another flow chart of the low bit rate read operation following the process shown in FIG. 11.

FIGS. 11 and 12 are flowcharts of the low bit rate read operation of the first embodiment of the present invention. The information of the schedule table 13 indicated by the pointer (FIG. 6), for example, the attribute information is referred to (step (A1)). Next, it is determined whether or not the access time slot is an idle or pause access time slot (step (A2)). When the corresponding magnetic disk drive is in operation (ACT), a command to read or write data is issued against the above magnetic disk drive (step (A3)). Then, the bit rate parameter N for the user processed is saved (step (A4)). If it is determined in step (A2) that the access time slot is an idle or pause access time slot, the process proceeds to step (A4).

The pointer indicating the schedule table 13 is incremented (step (A5)), and the value of a counter C is incremented (step (S6)). It is determined whether the value of the bit rate parameter saved in step (A4) is equal to 1 (step (A7)). When N=1, the bit rate is the normal bit rate. In this case, it is determined whether the status information indicates "returning" (step A(8)). When it is determined that N is not equal to 1, the bit rate is the low bit rate. In this case, it is determined whether the status information indicates "updating" (step A(12)).

In the case where N is equal to 1 and the status information indicates "returning", the value of the counter C is checked (step (A9)). That is, it is determined a surplus of the value of the counter C obtained by performing an operation "mod n" is equal to 0 where n is the number of magnetic disk drives DSK1–DSKn. When Cmod n=0, C is set equal to 0, and the status information is changed so that it indicates "normal" (step (A10)). The value of the counter obtained in this case indicates that an access from the beginning magnetic disk drive to the last magnetic disk drive is completed. In other words, the above value indicates a partition of the access cycle for the magnetic disk drives. Then, the next schedule is registered in the schedule table 13 (FIG. 6) (step (A11)).

If it is determined in step (A8) that the status information does not indicate "returning", the process proceeds to step (A10), and changes the status information to "normal". If it is determined in step (A9) that Cmod n is not equal to 0, "pause" is registered in the schedule table 13 as the next schedule (step (A16)).

It is determined in step (A12) that the status information indicates "updating". If the status information indicates "updating", it is determined whether the value of the counter C satisfies C≦2n (step (A13)). If C>2n, the process proceeds to step (A11). If C≦2n, the status information is changed to "normal" (step (A15)), and the process proceeds to step (A16). If it is determined in step (A12) that the status information does not indicate "updating", it is determined in step (A12) that the value of the counter C satisfies C≦n. If it is determined that C >n, the process proceeds to step (A16). If it is determined that C≦n, the process proceeds to step (A11).

If the next schedule is registered as "pause" in step (A16), it is determined whether C≧nN (step (A17)). If C<nN, the process is ended. If C≧nN, the value of the counter C is set equal to 0 and the process is ended. That is, as shown in FIG. 8, the period nT(N−1) is made to pause in order to transfer, during cycle nT(N−1), data read during the cycle nT. It is determined, based on the value of thus counter C, whether the cycle nN has passed. After thes end of the process shown in FIG. 12, the process is continuously carried out from step (A1). By providing the pause schedule, it is possible to perform the low bit rate read operation at the bit rate 1/N via the buffer memories.

Figure 13:
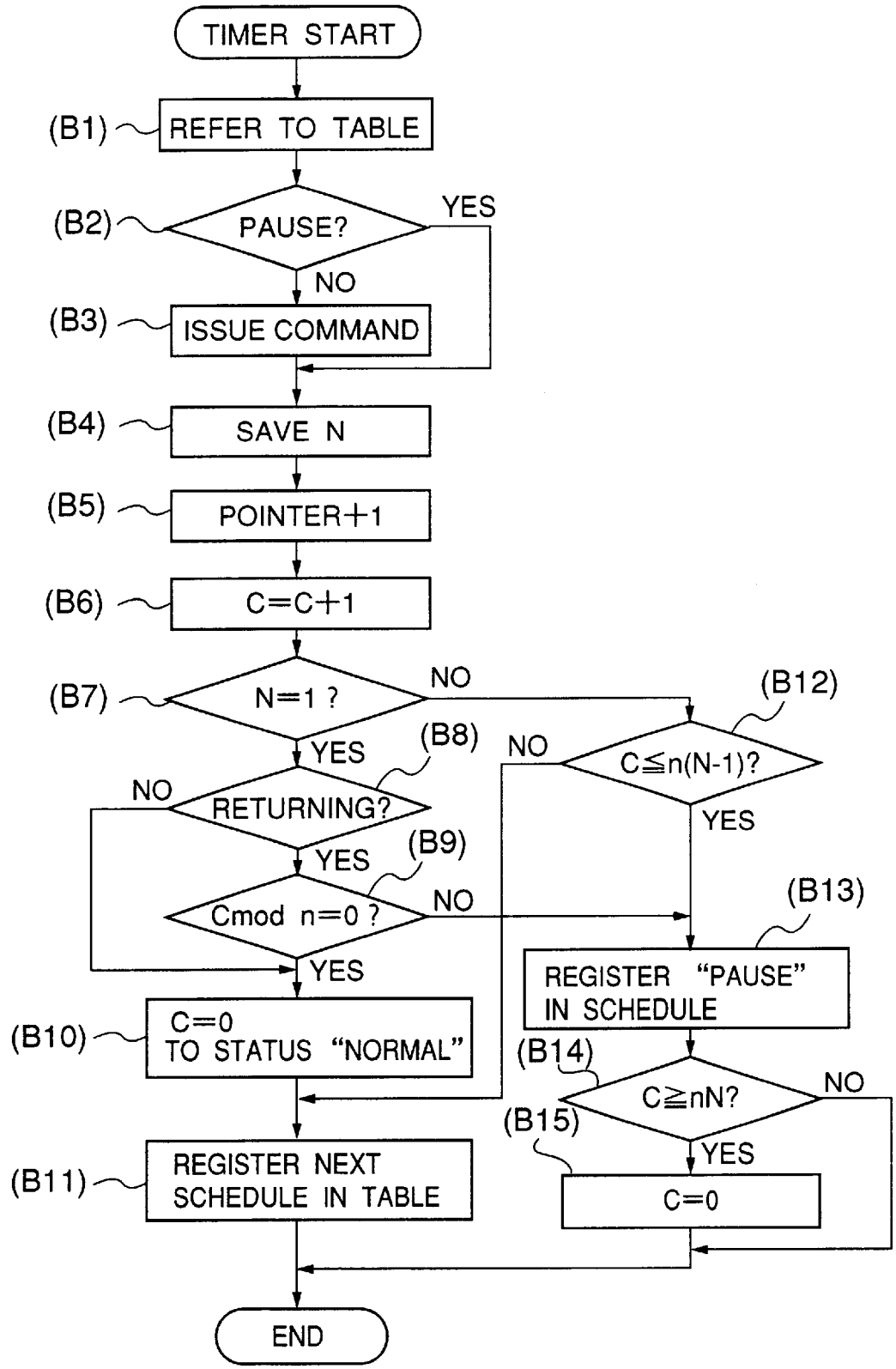
FIG. 13 is a flowchart of a low bit rate write operation of the first embodiment of the present invention.

FIG. 13 is a flowchart of the low bit rate write operation in the first embodiment of the present invention. The schedule table 13 (FIG. 6) is referred to in accordance with the indication of the pointer (step (B1)). It is determined at step (B2) whether a pause is indicated. If the result of step (B2) is affirmative, a command is issued against the magnetic disk drive (step (B3)) as in the case of the aforementioned step (A3). Subsequently, the bit rate parameter n is saved (step (B4)). If the result of step (B2) indicates "pause", no command is issued and the bit rate parameter N is saved (step (B4)).

Then, as in the case of the aforementioned steps (A5) and (A6), the pointer is incremented by +1 (step (B5)), and the value of the counter C is incremented by +1 (step (B6)). It is determined at step (B7) whether the saved bit rate parameter N is equal to 1. When N=1 (normal), it is determined at step (B8) whether the returning process is being performed. When the result of step (B8) is affirmative, it is determined at step (B9) whether Cmod n is equal to 0, as in the case of the aforementioned step (A9). When it is determined that Cmod n=0, the content of the counter C is set equal to 0, and the status information is changed to "normal" (step (B10)). Then, the next schedule is registered in the schedule table 13 at step (B11).

When it is determined at step (B9) that Cmod n is not equal to 0, the next schedule is registered, as "pause", in the schedule table 13 at step (B13). When it is determined at step (B7) that N is not equal to 1, it is determined at step (B12) that C≦n(N−1). If this condition is satisfied, the process proceeds to step (B13), and the next schedule is set to "pause". If the above condition is not satisfied, the process proceeds to step (B11), and the next schedule is registered.

After the next schedule is registered as "pause" at step (B13), it is determined at step (B14) whether C≧nN. When it is determined that C≧nN, the value of the counter C is set equal to 0 at step (B15), and the process is ended. When it is determined at step (B14) that C<nN, the process is ended. That is, as shown in FIG. 10, the n(N−1)T is set to the pause cycle, and data transferred during the period nTN is written during the next cycle nT, so that the low bit rate data write operation can be performed at the bit rate equal to 1/N.

Figure 14:
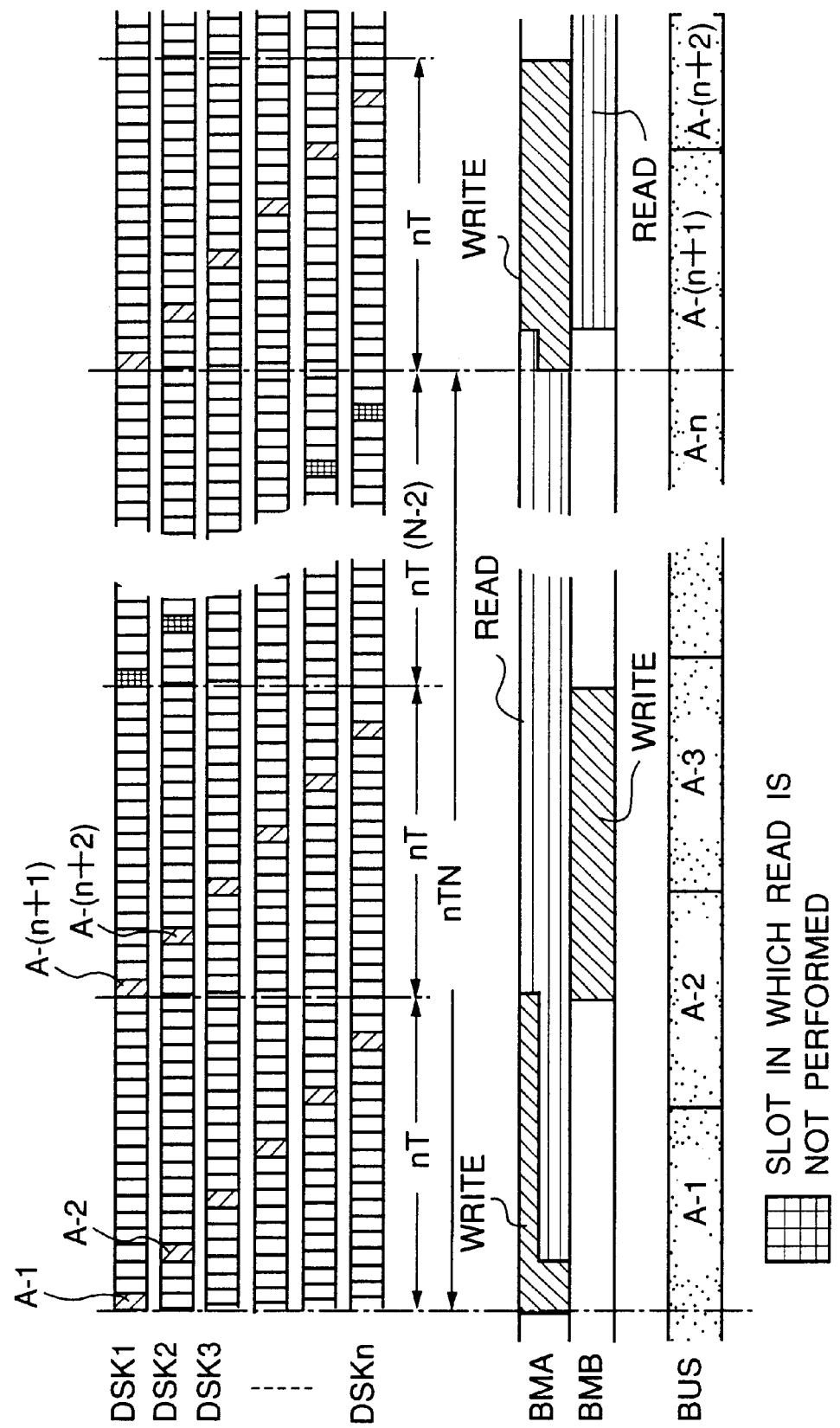
FIG. 14 is a sequence diagram of a low bit rate read operation in a second embodiment of the present invention having a double-buffer configuration.

FIG. 14 is a diagram of a low bit rate read operation using double buffers according to a second embodiment of the present invention. During the first nT cycle in the nTN cycle, unit data A-1 through A-n respectively read from the magnetic disk drives DSK1–DSKn are stored in the buffer memory BMA, and the read operation is started from the unit data A-1 at the bit rate equal to 1/N. The unit data thus read is sent to the bus BUS. During the next cycle nT, unit data A-(n+1) through A-2n are respectively preread from the magnetic disk drives DSK1 through DSKn, and are stored in the buffer memory BMB. During the subsequent cycle nT(N-2), the read operation on the original data of the unit data is not carried out but is made to pause.

The unit data A-1 through A-n respectively read from the magnetic disk drives DSK1 through DSKn during the cycle nT are sent to the bus BUS from the buffer memory BMA. This is equivalent to an operation in which data is read from the storage device at the bit rate equal to 1/N. During the cycle nT of the next cycle nTN, the unit data are read from the magnetic disk drives DSK1 through DSKn again and are stored in the buffer memory BMA. The unit data A-(n+1) through A-2n are read from the buffer memory BMB and are sent to the bus BUS during the cycle nTN. The above operation is repeatedly carried out, so that the low bit rate read operation can be performed.

Figure 15:
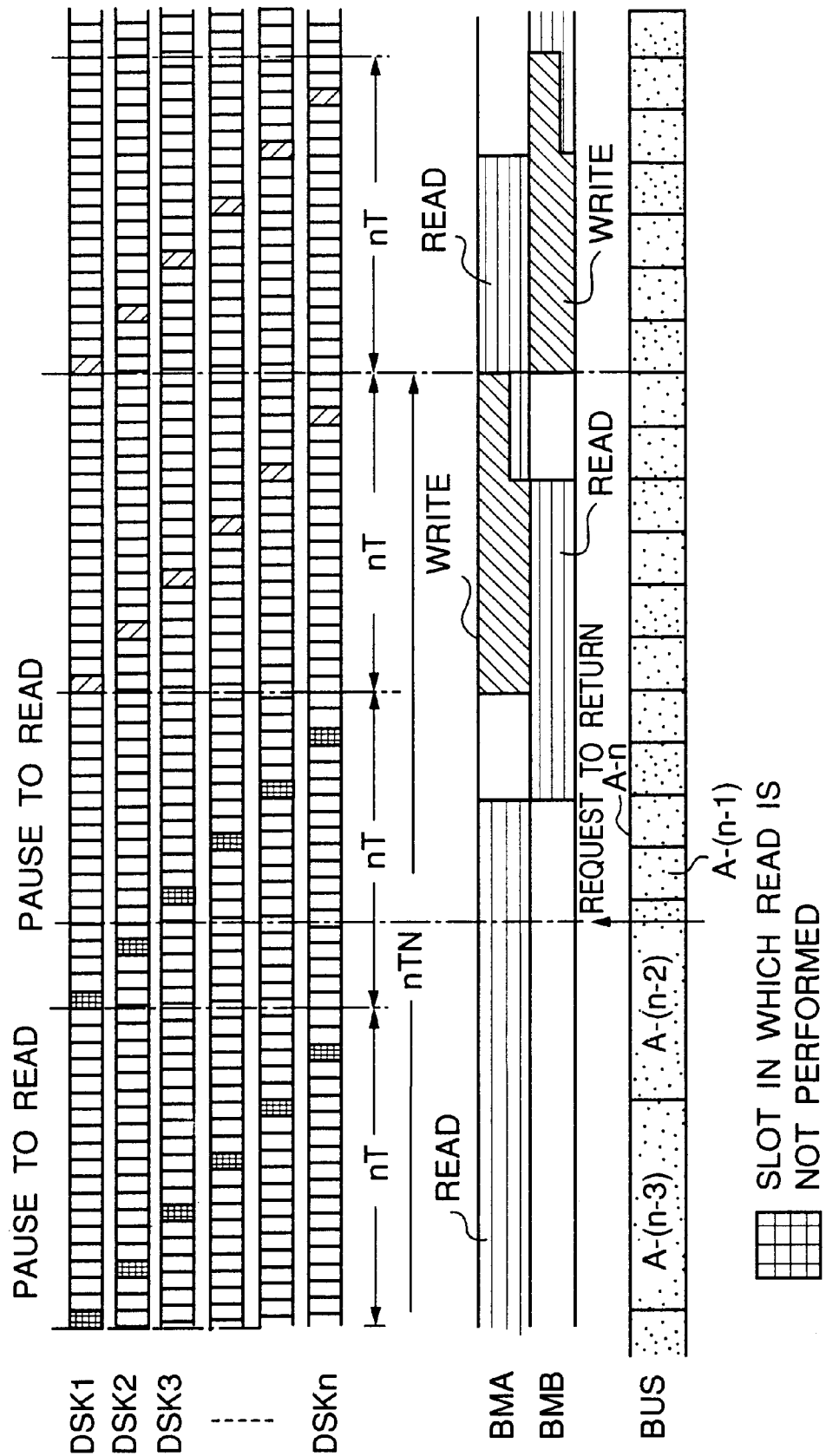
FIG. 15 is a sequence diagram of an operation executed when it is requested to return the read bit rate to the original bit rate in the second embodiment of the present invention.

FIG. 15 is a diagram of an operation in the read operation is returned to the normal bit rate using the double buffers according to the second embodiment of the present invention. The unit data of original data are read from the buffer memory BMA at the bit rate equal to 1/N, and are sent to the bus BUS. Further, the read operation in which unit data of the above original data are read from the magnetic disk drives DSK1 through DSKn are made to pause. In the above state, if a request to return to the normal bit rate, reading of data from the buffer memory BMA is returned to the normal bit rate because the unit data preread during the cycle nT are stored in the buffer memory BMB. When reading of the unit data frcm the buffer memory BMA during the cycle nT is completed, the buffer memory is switched to the buffer memory BMB and the unit data is continuously read at the normal bit rate. During the next cycle nT, the unit data respectively read from the magnetic disk drives DSK1 through DSKn are stored in the buffer memory BMA, and thus the storage device is returned to the normal state.

Figure 16:
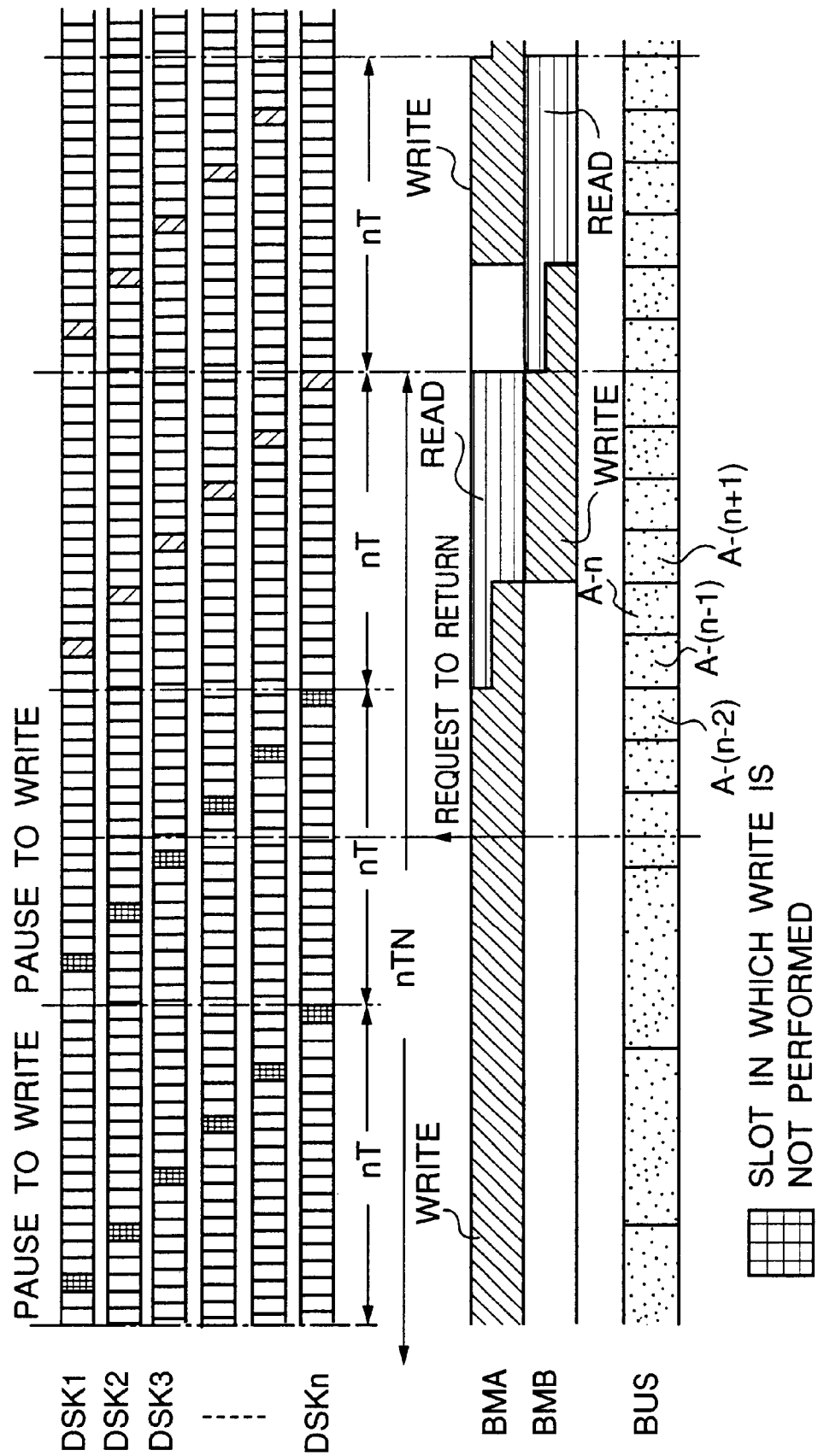
FIG. 16 is a sequence diagram of an operation execute when it is requested to return the write bit rate to the original bit rate in the second embodiment of the present invention.

FIG. 16 is a diagram of an operation in which the write operation is returned to the normal bit rate using the double buffers according to the second embodiment of the present invention. In FIG. 16, the bit rate is returned to the original bit rate when the data transferred during the cycle nTN are written into the magnetic disk drives DSK1 through DSKn during the cycle nT. The unit data transferred via the bus BUS are stored in the buffer memory BMA and a request to return to the normal bit rate is issued while the written operation on the magnetic disk drives DSK1 through DSKn is made to pause. The transfer bit rate of the bus BUS is returned to the normal bit rate. In this case, unit data up to unit data A-n is continuously stored in the buffer memory BMA. When the next cycle nT is started, the reading of unit data from the buffer memory BMA is started. The unit data thus read are then written into the magnetic disk drives DSK1 through DSKn.

Unit data transferred during the cycle nT via the bus BUS after unit data A-(n+1) are stored in the buffer memory BMB, and are then written into the magnetic disk drives DSK1–DSKn during the next cycle nT.

Figures 17A, 17B:
FIGS. 17A and 17B are diagrams of a table used in a third embodiment of the present invention.

FIGS. 17A and 17B are diagrams explaining a third embodiment of the present invention. More particularly, FIG. 17 shows an order of access to the magnetic disk drives DSK1, DSK2 and DSK3 in which the horizontal axis denotes time. The reading or writing of unit data is carried out in the access order "1"–"7". In this case, the access order "1"–"7" is circulated. It will be noted that at least one access time slot is provided in the cycle of the access order in order to enable a change in the schedule.

By using the idle time slots, it is possible to coexist the reading and writing operations. In this case, if the read operation and the write operation are alternately carried out, it is necessary to provide idle access time slots corresponding to the number of times that the read operation and the write operation are alternately carried out.

With the above in mind, as shown in FIG. 17B, the access order is rearranged so that the access order is successive when viewed from the magnetic disk drives. More particularly, a table is defined in which there are provided a number (No.) indicating the order in the access cycle, an access time slot ATS, read/write R/W, and status. The table shown in FIG. 17B relates to the magnetic disk drive DSK1, and the access time slot ATS defined therein has an order of 1, 4, 7, 3, 6, 2, 5.

FIG. 17B shows an arrangement in which the access time slot 5 for the number No. 7 is made idle, the time slots for No. 1–No. 4 located before a reference line L are used for reading, and the time slots for No. 5 and No. 6 located after the reference line are used for writing. The reference line L can be moved in accordance with the number of requests for writing or reading. Hence, it is possible to dynamically allot the access time slots ATS to the read and write operations.

With respect to a read request from a user, the schedule is registered forward on the time base from the reference line L. With respect to a write request, the schedule is registered backward on the time base from the reference line L. In this case, a registration starting position for reading is denoted as Rs, and a registration ending position is denoted as Re. Similarly, a registration starting position for writing is denoted as Ws, and a registration ending position is denoted as We. The already registered time slot is given status bit "1" which shows "busy".

Figure 18:
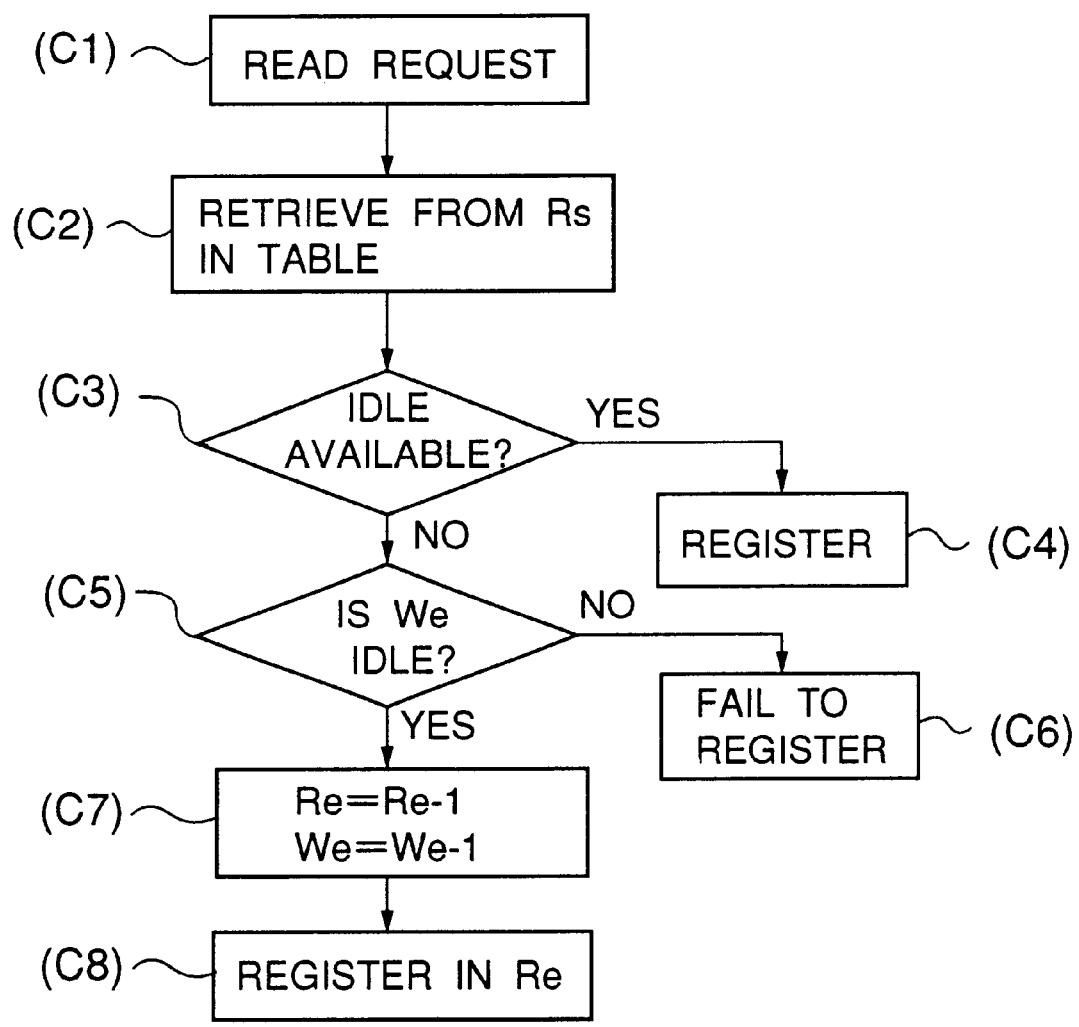
FIG. 18 is a flowchart of a process of registering a read request in the third embodiment of the present invention.

FIG. 18 is a flowchart of a process of registering a read request according to the third embodiment of the present invention. When a read request is issued at step (C1), a retrieval is started from the registration starting position Rs for reading toward the registration ending position Re at step (C2). Then, it is determined at step (C3) whether there is an idle access time slot.

If an idle access time slot is found, the read request is registered at step (C4). For example, No. 2 in the table shown in FIG. 17B is not busy, and therefore the access time slot 4 of No. 2 is registered with respect to the above read request. Then, the status "busy" is set. If there is no idle access time slot, it is determined at step (C5) whether the registration ending position We for writing is idle. If the result of step (C5) is negative, the read request is handled so that the read request fails to be registered at step (C6).

If the registration ending position We for writing is idle, Re is set equal to Re−1 and We is set equal to We−1 at step (C7) in order to move the registration ending position. Thereby, one area for reading is added while one area for writing is deleted. Then, the access time slot of the new registration ending position Re for reading is registered for reading. Hence, it is possible to coexist the read and write operations.

Figure 19:
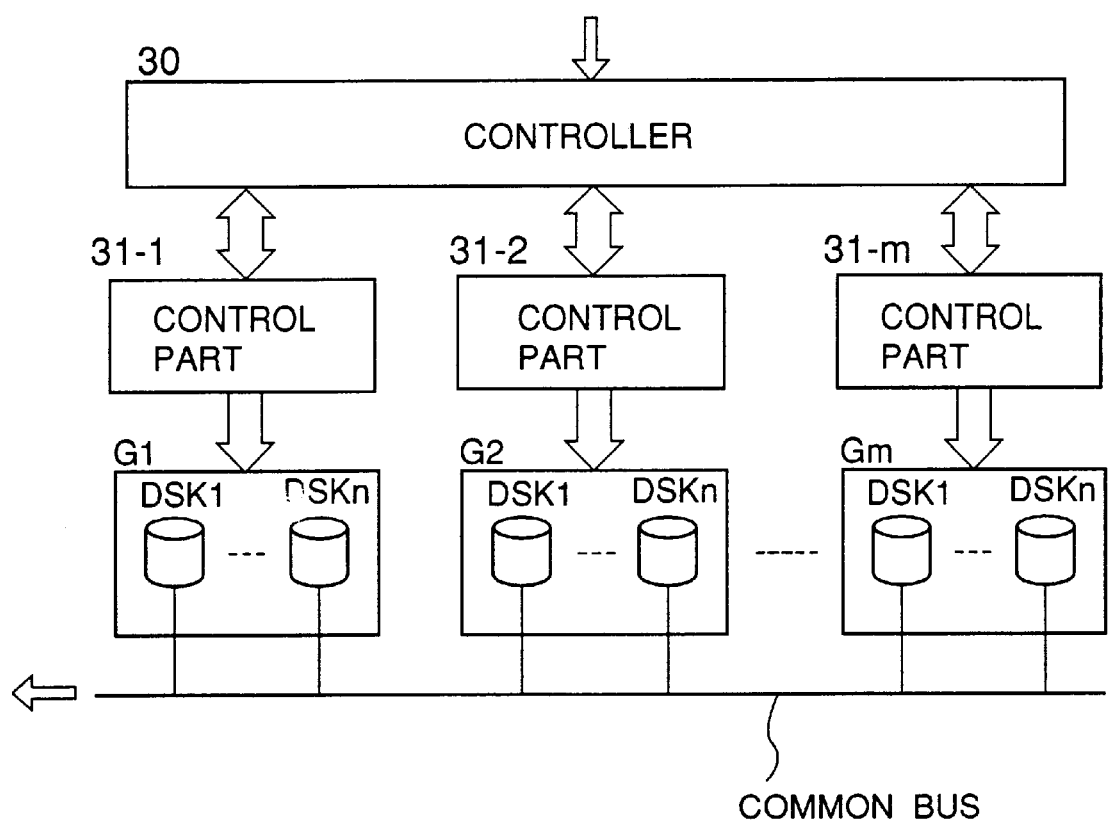
FIG. 19 is a block diagram of a fourth embodiment of the present invention.

FIG. 19 is a block diagram of a storage device according to a fourth embodiment of the present invention. The storage device includes a plurality of groups G1–Gm, each of the groups includes a minimum number of magnetic disk drives DSK1–DSKn which makes it possible to provide services of reading or writing data for a plurality of users. The storage device shown in FIG. 19 includes control parts 31-1 through 31-m respectively provided for the groups G1–Gm. Each of the control parts 31-1 through 31-m corresponds to the aforementioned control device 1 shown in FIG. 6. A controller 30 is provided in common to the control parts 31-1 through 31-m, and controls them. The control parts 31-1 through 31-m can cooperate with each other via the controller 30.

FIG. 19 shows an arrangement in which the magnetic disk drives DSK1 through DSKm of each of the groups G1 through Gm are connected to a common bus. The storage device can communicate with the users and can transfer read unit data or write unit data. Alternatively, it is possible to provide a plurality of buses respectively for an arbitrary number of partitions each including one or a plurality of groups among the groups G1–Gm.

The magnetic disk drives DSK1–DSKn of one of the groups G1–Gm can perform the aforementioned read and write operations of any of the first to third embodiments of the present invention. If some magnetic disk drives are newly added to cope with an increase in the number of users or an increased number of types of data, such an extension is carried out on the group base. With respect to requests from the users, the controller 30 totally controls the control parts 31-1 through 31-m respectively controlling the groups G1–Gm. The controller 30 has a system configuration management of the groups G1–Gm, a work management directed to controlling the control parts 31-1–31-m in response to requests from the users, and a maintenance management which manages faults which may occur in the magnetic disk drives. These functions can be realized by management means employed in various known systems.

In the system having a plurality of groups, it is possible to employ a redundant configuration in order to avoid a concentration of access requests. For example, if there is data which is frequently requested to be read, identical data are stored in a plurality of groups. The controller 30 controls these groups so that read requests are distributed to the groups in order to avoid a concentration of read requests. Hence, responsibility to requests from the users can be improved. If a write request conflicts with read requests, the controller 30 distributes the read requests to the groups and gives the write request priority over the read requests. When magnetic disk drives are newly added in order to extend the storage device, such an extension can be carried out on the group base. Hence, it is not necessary to rearrange or reallocate data. As a result, the controller 30 can perform an access distributing control of the extended group by using the system configuration management function.

Figure 20:
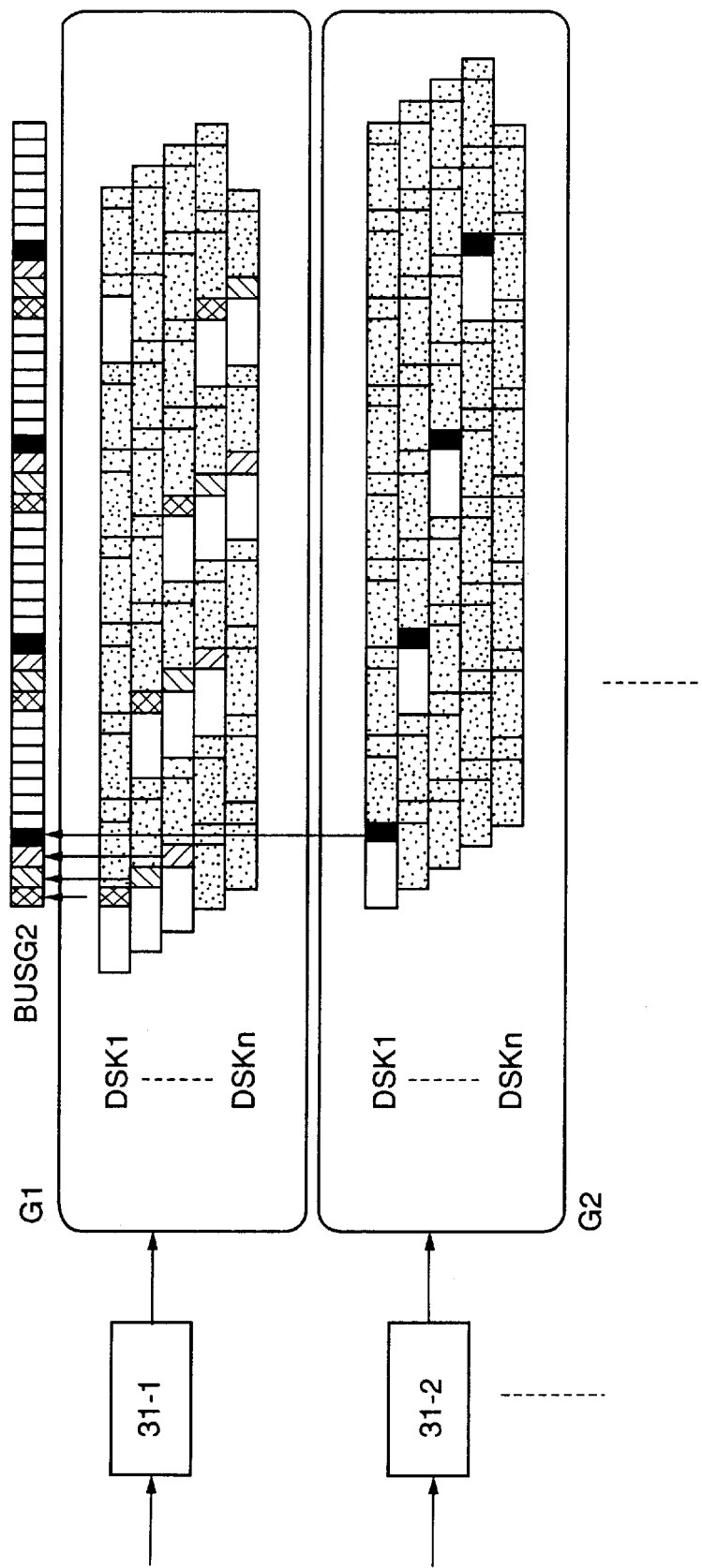
FIG. 20 is a sequence diagram of an operation of the fourth embodiment of the present invention.

FIG. 20 is a diagram of an operation of the storage device according to the fourth embodiment of the present invention.

More particularly, FIG. 20 shows two groups G1 and G2, each having respective magnetic disk drives DSK1–DSKn, the control parts 31-1 and 31-2, and the bus BUS. Different data streams are respectively read from the magnetic disk drives DSK1, DSK2 and DSK3 of the group G1 and the magnetic disk drive and are transferred via the bus BUS.

For example, it will now be assumed that a data stream which is identical to or close to a data stream stored in the magnetic disk drives DSK1–DSKn of the group G1 is stored in the magnetic disk drives DSK1–DSKn of the group G2. In response to a request issued by a user, the control part 31-1 reads items of unit data of the data stream and sends the items to the bus BUS. In the prior art, if the user issues a request for a jump with respect to the identical data stream or a jump with respect to the data stream having a close relationship with the data stream, it takes a long time to change the schedule or it is impossible to change the schedule.

According to the fourth embodiment of the present invention, a cooperation between the control part 31-1 and the control part 31-2 can be made so that the access can be jumped to the group G2 from the group G1. Hence, it is possible to immediately correspond to the request from the user. Similarly, if a request for high bit rate reproduction of video data or the like is issued, the switching between the groups can be carried out by transferring control information between the control parts. In the above manner, the redundant configuration can effectively be utilized so that an improve-ment in the services can be realized.

According to the present invention, it is possible to efficiently utilize the buffer memory 9 to enable the low bit rate data write/read operation of the bit rate 1/N requested by the user without any change of the access bit rate with respect to the storage parts 3-1 through 3-n such as magnetic disk drives DSK1–DSKn of the storage device 2. Further, it is possible to easily perform the schedule management control using the schedule table 13 directed to changing the bit rate. Now, an arbitrary number α will be defined so as to equal to or greater than 2. When α=N, it is defined so that the bit rate is the normal bit rate. When α<N, the low bit rate operation can be accomplished, while the high bit rate operation can be accomplished when α>N. Hence, it is possible to easily correspond to requests from the users, such as a slow bit rate reproduction and a high bit rate reproduction.

If a data read request and a data write request coexist, the access time slots arranged in the access order are partitioned in a group for reading and another group for writing. Hence, it is possible to reduce idle access time slots and dynamically change the partition at which the access time slots are grouped. With the above, it is possible to improve the efficiency in use of the storage parts and reduce a situation in which an access request is caused to wait for processing and to improve the services.

A plurality of storage parts such as magnetic disk drives are grouped into groups, and a system extension is carried out on the group base. Hence, it is not necessary to reallocate data when the scale of the storage device is extended, so that the storage device can easily be extended. When the aforementioned redundant configuration is employed, it is possible to easily correspond to a request for a jump between different data streams and a request for changing the data bit rate.

The present invention is not limited to the specifically disclosed embodiments, and variations and modifications may be made without departing from the scope of the present invention.

What is claimed is:

1. A control device for a storage device in which data streams are respectively divided into unit data, which are distributed to storage parts and are sequentially read therefrom for every unit data, said control device comprising:

a buffer memory which stores data to be written into the storage parts and read from the storage parts;

an input/output control part which causes the unit data read from the storage parts in an access cycle corresponding to a bit rate to be stored in the buffer memory and causes the unit data stored in the buffer memory at the bit rate to be written into the storage parts; and an input/output interface part which establishes an interface between the storage device and an external apparatus and reads and writes the unit data from and into the buffer memory so that the bit rate is changed in accordance with a signal applied to the control device, thereby data can consecutively be transferred between the buffer memory and the external apparatus; wherein:

a group is defined which includes a minimum number of storage parts which enables a given service;

the storage device includes a plurality of such groups; and said control device comprises control parts respectively provided to the plurality of groups, and a controller which controls said control parts.

2. The control device as claimed in claim 3, wherein:

said buffer memories comprises a first buffer and a second buffer having a storage capacity which enables the unit data read or written during the access cycle; and said input/output interface part performs a switching operation on the first and second buffers in response to a change of the bit rate.

3. A device for accessing a storage device including storage parts, wherein data streams are divided into unit data, which are distributed to and written into the storage parts and are sequentially read therefrom for every unit data, comprising:

a buffer memory for storing the unit data which is input during a cycle equal to N times a cycle nT in response to a request to change a write bit rate from an original bit rate to another bit rate where N is a bit rate parameter, T is an access cycle and n is the number of the storage parts;

a control part for reading the unit data from the buffer memory and writing the unit data thus read into the storage parts in the cycle nT;

wherein the writing of the data streams during a cycle nT(N−1) before said cycle nT to pause, so that data is written into the storage parts at said another bit rate equal to 1/N; and wherein the reading of the data streams during a cycle nT(N−1) before said cycle nT to pause, so that data is written into the storage parts at said another bit rate equal to 1/N;

a group is defined which includes a minimum number of storage parts which enables a given service;

the storage device includes a plurality of such groups; and a control device comprises control parts respectively provided to the plurality of groups, and a controller which controls said control parts.

4. A method of accessing a storage device comprising storage parts and a control device, wherein data streams are divided into unit data, which are distributed to and written into the storage parts and are sequentially read therefrom for every unit data, said method comprising the steps of:

storing the unit data which is read during a cycle nT in a buffer memory in response to a request to change a read bit rate from an original bit rate to another bit rate where T is an access cycle and n is the number of the storage parts;

reading the unit data from the buffer memory in a cycle nTN where N is a bit rate parameter;

making reading of the data streams during a cycle nT(N−1) after said cycle nT to pause, so that data is sent from the storage device at said another bit rate equal to 1/N;

causing at least one of access time slots arranged in an access order for the storage parts to an idle access time slot;

grouping the access time slots into a first group provided for reading and a second group provided for writing;

assigning the first group of access times slots to a read request;

assigning the second group of access time slots to a write request; and changing grouping of the access time slots if the first group of the second group does not have enough access time slots to accept the read request or the write request, so that the read request or the write request can be accepted.

5. The method as claimed in claim 4, further comprising the steps of:

writing the unit data into a first buffer of said buffer memory during the cycle nT;

writing the unit data into a second buffer of said buffer memory during a next cycle nT;

reading the unit data from the first buffer during the cycle nT(N−1);

reading the unit data from the second buffer during the cycle nT(N−1); and reading remaining unit data stored in one of the first and second buffers at the original bit rate when the write bit rate should be changed to the original bit rate.

6. A method of accessing a storage device comprising storage parts and a control device, wherein data streams are divided into unit data, which are distributed to and written into the storage parts and are sequentially read therefrom for every unit data, said method comprising the steps of:

storing the unit data which is input during a cycle equal to N times a cycle nT in a buffer memory in response to a request to change a write bit rate from an original bit rate to another bit rate where N is a bit rate parameter, T is an access cycle and n is the number of the storage parts;

reading the unit data from the buffer memory and writing the unit data thus read into the storage parts in the cycle nT;

making writing of the data streams during a cycle nT(N−1) before said cycle nT to pause, so that data is written into the storage parts at said another bit rate equal to 1/N;

causing at least one of access time slots arranged in an access order for the storage parts to an idle access time slot;

grouping the access time slots into a first group provided for reading and a second group provided for writing;

assigning the first group of access time slots to a read request;

assigning the second group of access time slots to a write request and;

changing grouping of the access time slots if the first group or the second group does not have enough access time slots to accept the read request or the write request, so that the read request or the write request can be accepted.

7. The method as claimed in claim 6, further comprising the steps of:

storing the unit data which is input during the cycle nTN into a first buffer of the buffer memory;

writing the unit data read from the first buffer during the cycle nT into the storage parts;

storing unit data which is input in the cycle nTN in a state where the unit data is written into the storage parts in a second buffer of the buffer memory;

writing the unit data read from the second buffer in the cycle nT into the storage parts; and storing, when the write bit rate should be changed to the original bit rate, input unit data into one of the first and second buffers and writing unit data remaining another one of the first and second buffers into the storage parts.

8. A method of accessing a storage device comprising storage parts and a control device, wherein data streams are divided into unit data, which are distributed to and written into the storage parts and are sequentially read therefrom for every unit data, said method comprising the steps of:

storing the unit data which is read during a cycle nT in a buffer memory in response to a request to change a read bit rate from an original bit rate to another bit rate where T is an access cycle and n is the number of the storage parts;

reading the unit data from the buffer memory in a cycle nTN where N is a bit rate parameter;

making reading of the data streams during a cycle nT(N−1) after said cycle nT to pause, so that data is sent from the storage device at said another bit rate equal to 1/N;

writing the unit data into a first buffer of said buffer memory during the cycle nT;

writing the unit data into a second buffer of said buffer memory during a next cycle nT;

reading the unit data from the first buffer during the cycle nT(N−1);

reading the unit data from the second buffer during the cycle nT(N−1); and reading remaining unit data stored in one of the first and second buffers at the original bit rate when the write bit rate should be changed to the original bit rate.

9. A method of accessing a storage device comprising storage parts and a control device, wherein data streams are divided into unit data, which are distributed to and written into the storage parts and are sequentially read therefrom for every unit data, said method comprising the steps of:

storing the unit data which is read during a cycle nT in a buffer memory in response to a request to change a read bit rate from an original bit rate to another bit rate where T is an access cycle and n is the number of the storage parts;

reading the unit data from the buffer memory in a cycle nTN where N is a bit rate parameter; and making reading of the data streams during a cycle nT(N−1) after said cycle nT to pause, so that data is sent from the storage device at said another bit rate equal to 1/N;

wherein:

a group is defined which includes a minimum number of storage parts which enables a given service;

the storage device includes a plurality of such groups;
said control device comprises control parts respectively provided to the plurality of groups, and a controller which controls said control parts; and
the method comprises a step of distributing, under control of the control parts and the controller, an access requests which concentrate on one of the groups to other groups.

10. A method of accessing a storage device comprising storage parts and a control device, wherein data streams are divided into unit data, which are distributed to and written into the storage parts and are sequentially read therefrom for every unit data, said method comprising the steps of:

storing the unit data which is read during a cycle nT in a buffer memory in response to a request to change a read bit rate from an original bit rate to another bit rate where T is an access cycle and n is the number of the storage parts;

reading the unit data from the buffer memory in a cycle nTN where N is a bit rate parameter; and making reading of the data streams during a cycle nT(N−1) after said cycle nT to pause, so that data is sent from the storage device at said another bit rate equal to 1/N; wherein:

a group is defined which includes a minimum number of storage parts which enables a given service;

the storage device includes a plurality of such groups;

said control device comprises control parts respectively provided to the plurality of groups, and a controller which controls said control parts; and the method comprises a step of distributing, under control of the control parts and the controller, an access request to a first group from a second group to which the access request is originally applied, the first group having data identical to or close to data stored in the second group.

11. A method of accessing a storage device comprising storage parts and a control device, wherein data streams are divided into unit data, which are distributed to and written into the storage parts and are sequentially read therefrom for every unit data, said method comprising the steps of:

storing the unit data which is input during a cycle equal to N times a cycle nT in a buffer memory in response to a request to change a write bit rate from an original bit rate to another bit rate where N is a bit rate parameter, T is an access cycle and n is the number of the storage parts;

reading the unit data from the buffer memory and writing the unit data thus read into the storage parts in the cycle nT;

making writing of the data streams during a cycle nT(N−1) before said cycle nT to pause, so that data is written into the storage parts at said another bit rate equal to 1/N;

storing the unit data which is input during the cycle nTN into a first buffer of the buffer memory;

writing the unit data read from the first buffer during the cycle nT into the storage parts;

storing unit data which is input in the cycle nTN in a state where the unit data is written into the storage parts in a second buffer of the buffer memory;

writing the unit data read from the second buffer in the cycle nT into the storage parts; and storing, when the write bit rate should be changed to the original bit rate, input unit data into one of the first and second buffers and writing unit data remaining another one of the first and second buffers into the storage parts.

12. A method of accessing a storage device comprising storage parts and a control device, wherein data streams are divided into unit data, which are distributed to and written into the storage parts and are sequentially read therefrom for every unit data, said method comprising the steps of:

storing the unit data which is input during a cycle equal to N times a cycle nT in a buffer memory in response to a request to change a write bit rate from an original bit rate to another bit rate where N is a bit rate parameter, T is an access cycle and n is the number of the storage parts;

reading the unit data from the buffer memory and writing the unit data thus read into the storage parts in the cycle nT; and making writing of the data streams during a cycle nT(N−1) before said cycle nT to pause, so that data is written into the storage parts at said another bit rate equal to 1/N; wherein:

a group is defined which includes a minimum number of storage parts which enables a given service;

the storage device includes a plurality of such groups;

said control device comprises control parts respectively provided to the plurality of groups, and a controller which controls said control parts; and the method comprises a step of distributing, under control of the control parts and the controller, access requests which concentrate on one of the groups to other groups.

13. A method of accessing a storage device comprising storage parts and a control device, wherein data streams are divided into unit data, which are distributed to and written into the storage parts and are sequentially read therefrom for every unit data, said method comprising the steps of:

storing the unit data which is input during a cycle equal to N times a cycle nT in a buffer memory in response to a request to change a write bit rate from an original bit rate to another bit rate where N is a bit rate parameter, T is an access cycle and n is the number of the storage parts;

reading the unit data from the buffer memory and writing the unit data thus read into the storage parts in the cycle nT; and making writing of the data streams during a cycle nT(N−1) before said cycle nT to pause, so that data is written into the storage parts at said another bit rate equal to 1/N; wherein:

a group is defined which includes a minimum number of storage parts which enables a given service;

the storage device includes a plurality of such groups;

said control device comprises control parts respectively provided to the plurality of groups, and a controller which controls said control parts; and the method comprises a step of jumping, under control of the control parts and the controller, an access request to a first group from a second group to which the access request is originally applied, the first group having data identical to or close to data stored in the second group.

14. A method of accessing a storage device including storage parts, wherein data streams are divided into unit data, which are distributed to and written into the storage parts and are sequentially read therefrom for every unit data, comprising:

a buffer memory for storing the unit data which is read during a cycle nT in response to a request to change a read bit rate from an original bit rate to another bit rate where T is an access cycle and n is the number of the storage parts;

a control part for reading the unit data from the buffer memory in a cycle nTN where N is a bit rate parameter;

wherein the reading of the data streams during a cycle nT(N−1) after said cycle nT to pause, so that data is sent from the storage device at said another bit rate equal to 1/N;

a group is defined which includes a minimum number of storage parts which enables a given service;

the storage device includes a plurality of such groups; and a control device comprises control parts respectively provided to the plurality of groups, and a controller which controls said control parts.

* * * * *